United States Patent
Ninomiya et al.

(10) Patent No.: US 10,196,505 B2
(45) Date of Patent: Feb. 5, 2019

(54) RESIN COMPOSITION, FORMING RESIN COMPOSITION PREPARED BY USING THE SAME, LAMINATE, AND LAMINATE PRODUCING METHOD

(75) Inventors: Kenji Ninomiya, Osaka (JP); Kaname Kida, Osaka (JP); Yoshitaka Matsumura, Osaka (JP)

(73) Assignee: THE NIPPON SYNTHETIC CHEMICAL INDUSTRY CO., LTD., Osaka (JP)

( * ) Notice: Subject to any disclaimer, the term of this patent is extended or adjusted under 35 U.S.C. 154(b) by 685 days.

(21) Appl. No.: 12/677,861

(22) PCT Filed: Sep. 24, 2008

(86) PCT No.: PCT/JP2008/067194
§ 371 (c)(1),
(2), (4) Date: Mar. 12, 2010

(87) PCT Pub. No.: WO2009/041440
PCT Pub. Date: Apr. 2, 2009

(65) Prior Publication Data
US 2010/0255330 A1   Oct. 7, 2010

(30) Foreign Application Priority Data
Sep. 25, 2007   (JP) .................................. 2007-247908

(51) Int. Cl.
C08L 23/10   (2006.01)
C08L 23/08   (2006.01)
(Continued)

(52) U.S. Cl.
CPC .......... *C08L 23/10* (2013.01); *C08L 23/0853* (2013.01); *C08L 23/0861* (2013.01); *C08L 29/04* (2013.01);
(Continued)

(58) Field of Classification Search
CPC .. C08L 23/10; C08L 23/0853; C08L 23/0861; C08L 29/04; C08L 31/04;
(Continued)

(56) References Cited

U.S. PATENT DOCUMENTS 3,857,754 A * 12/1974 Hirata et al. ................. 428/35.7
3,975,463 A *  8/1976 Hirata et al. .................... 525/57
(Continued)

FOREIGN PATENT DOCUMENTS

CN   1502655 A   6/2004
EP   0177762 A2   4/1986
(Continued)

OTHER PUBLICATIONS

International Search Report for International Application No. PCT/JP2008/067194 dated Dec. 9, 2008.
Supplementary European Search Report dated Feb. 16, 2011.

*Primary Examiner* — Kevin R Kruer
(74) *Attorney, Agent, or Firm* — Greenblum & Bernstein, P.L.C.

(57) ABSTRACT

A resin composition is provided, which comprises: an ethylene-vinyl acetate copolymer (A); and a saponified ethylene-vinyl acetate copolymer (B) having an ethylene content of not less than 70 mol %, wherein the component (B) is present in a proportion of 1 to 30 parts by weight based on 100 parts by weight of the component (A). Where the resin composition is used in combination with a scrap laminate including a polyolefin resin layer and an EVOH layer for recycling the scrap laminate, die build-up is suppressed, and a product formed from the resulting recycled material is excellent in appearance and substantially free from coloration.

2 Claims, 1 Drawing Sheet

(51) Int. Cl.
  *C08L 29/04* (2006.01)
  *C08L 31/04* (2006.01)
  *C08K 3/34* (2006.01)
  *C08K 13/02* (2006.01)
  *C08L 51/06* (2006.01)
  *C08K 5/098* (2006.01)

(52) U.S. Cl.
  CPC ............... *C08L 31/04* (2013.01); *C08K 3/34* (2013.01); *C08K 5/098* (2013.01); *C08K 13/02* (2013.01); *C08L 51/06* (2013.01); *Y10T 428/31913* (2015.04)

(58) Field of Classification Search
  CPC ........... C08L 51/06; C08K 3/34; C08K 5/098; C08K 13/02; Y10T 428/31913
  See application file for complete search history.

(56) References Cited

U.S. PATENT DOCUMENTS

| | | | |
|---|---|---|---|
| 4,954,557 A | 9/1990 | Iwanami et al. | |
| 5,082,743 A * | 1/1992 | Itamura et al. | 428/520 |
| 5,322,877 A * | 6/1994 | Moriyama et al. | 524/399 |
| 5,409,973 A | 4/1995 | Bastioli et al. | 524/53 |
| 5,492,953 A * | 2/1996 | Itamura et al. | 524/239 |
| 6,258,464 B1 * | 7/2001 | Negi et al. | 428/516 |
| 6,753,370 B2 * | 6/2004 | Nakatsukasa et al. | 524/400 |
| 2004/0143049 A1 | 7/2004 | Onishi et al. | |
| 2007/0087212 A1 * | 4/2007 | Iyengar et al. | 428/474.4 |

FOREIGN PATENT DOCUMENTS

| | | |
|---|---|---|
| EP | 0400604 A2 | 12/1990 |
| EP | 0425820 A2 | 5/1991 |
| JP | 1-308439 | 12/1989 |
| JP | 3-72539 | 3/1991 |
| JP | 3-72542 | 3/1991 |
| JP | 3-215032 | 9/1991 |
| JP | 9-278952 | 10/1997 |
| JP | 2002-60496 | 2/2002 |
| JP | 2002-234971 A1 | 8/2002 |
| JP | 2003-54592 | 2/2003 |
| JP | 2004-168854 A1 | 6/2004 |

* cited by examiner

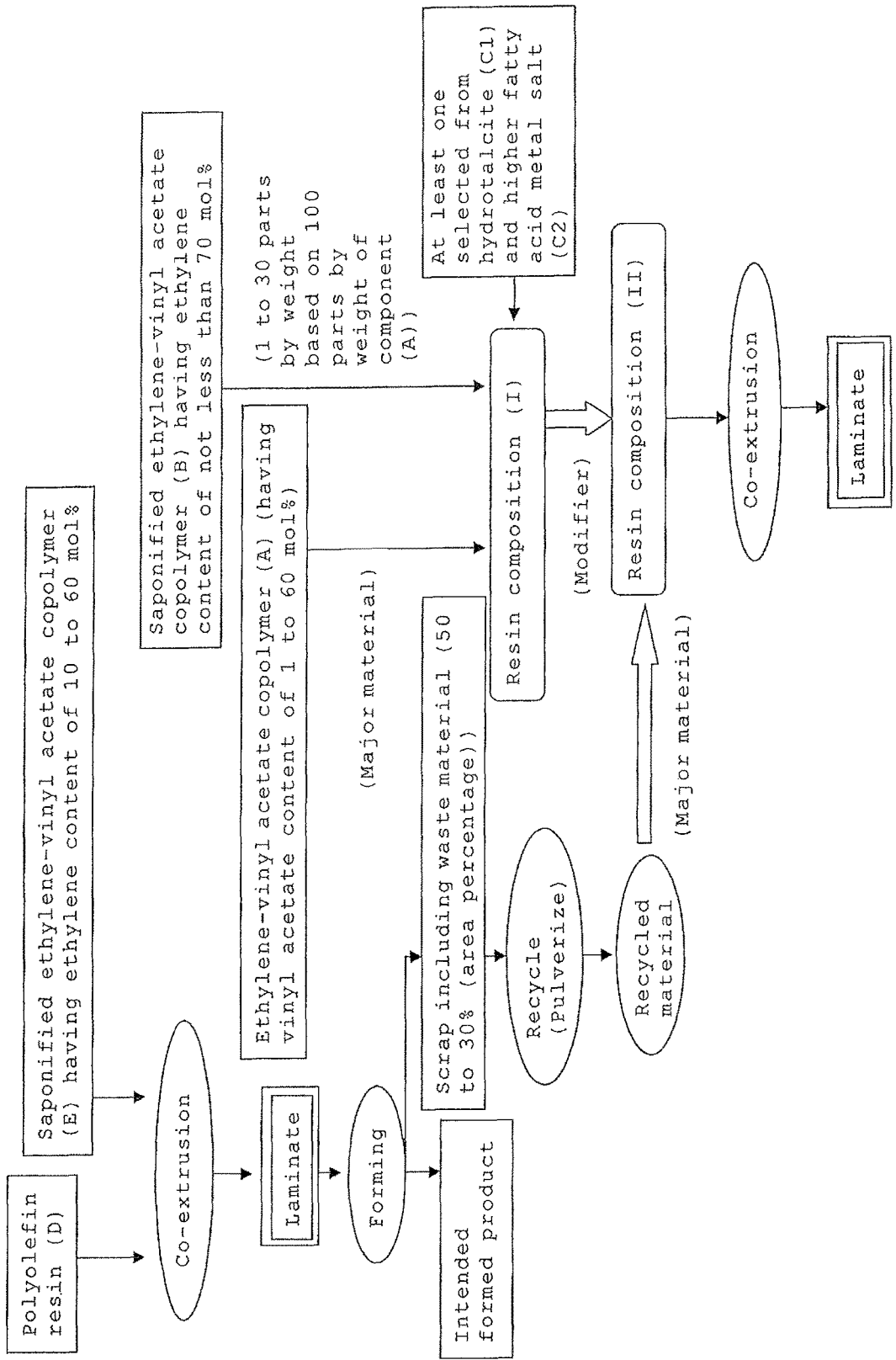

RESIN COMPOSITION, FORMING RESIN COMPOSITION PREPARED BY USING THE SAME, LAMINATE, AND LAMINATE PRODUCING METHOD

TECHNICAL FIELD

The present invention relates to a resin composition (I) which is blended with a scrap laminate (a waste material such as debris and end margins of products and defective products occurring during production of the products, and a refuse of molded/formed products after use in various applications) including a layer of a polyolefin resin and a layer of a saponified ethylene-vinyl acetate copolymer for recycling the scrap laminate in order to improve the melt-formability of the resulting recycled material. The invention further relates to a forming resin composition (II) prepared by using the resin composition (I), a laminate, and a laminate producing method.

BACKGROUND ART

Conventionally, a laminate including a layer of a polyolefin resin such as a polyethylene or a polypropylene and a layer (hereinafter sometimes abbreviated as "EVOH layer") of a saponified ethylene-vinyl acetate copolymer (hereinafter sometimes abbreviated as "EVOH") excellent in gas barrier property is formed into films, sheets, cups, trays, bottles and the like, which are commercially used for various applications with the advantageous properties of the laminate and, particularly, employed as packaging materials for foods and drugs. When the aforementioned products are formed from the laminate including the polyolefin resin layer and the EVOH layer, a waste material such as debris and end margins, and defective products occur. Further, refuses of the formed products occur after use in various applications. These scraps account for 50 to 30% (area percentage) of the original laminate. Therefore, the scraps are recycled to be melt-formed into a recycle layer (which is a so-called regrind layer and, in the present invention, sometimes referred to as "regrind layer") serving as at least one layer of a laminate. The recycling technique is industrially useful for reduction of industrial wastes and for economy, and employed in practical applications.

However, the compatibility between the polyolefin resin and the EVOH is poor. Therefore, when a scrap laminate including the polyolefin resin layer and the EVOH layer is re-melted to be reused as a material for a regrind layer, the polyolefin resin and the EVOH are not properly mixed with each other. Accordingly, a phase-separation product is liable to occur (die build-up), and is often incorporated in a formed product. This results in formation of fish eyes and holes in the formed product and formation of wave patterns on a surface of the formed product.

A known technique for ameliorating the compatibility that is the caused for the die build-up and the poor appearance is to blend a saponified ethylene-vinyl acetate copolymer having a higher ethylene content (see Patent Documents 1 to 3).

The ethylene-vinyl acetate copolymer is herein abbreviated as EVA. The EVA saponification product having higher ethylene content as identified above is highly compatible with polyolefins. More specifically, the higher ethylene content EVA saponification product is an ethylene-vinyl acetate copolymer saponification product having an ethylene content of not less than 70 mol %.

On the other hand, the EVOH is an ethylene-vinyl acetate copolymer saponification product (EVA saponification product) having an intermediate ethylene content and excellent in gas barrier property. More specifically, the EVOH is an ethylene-vinyl acetate copolymer saponification product having an ethylene content of 10 to 60 mol %.

The inventors of the present invention examined methods disclosed in Patent Documents 1 to 3, and found that these methods are relatively effective in solving the problems associated with the poor compatibility between the polyolefin resin and the EVOH, but lead to a problem such that the resulting regrind layers are colored yellow or red. In order to suppress the coloration, the inventors made an attempt to employ a smaller amount of the higher ethylene content EVA saponification product. However, the compatibilizing effect is impaired, so that the problems associated with the compatibility (the die build-up and the poor appearance) are insufficiently solved.

On the other hand, a resin composition which includes a base resin containing an EVA and a higher ethylene content EVA saponification product is proposed as a modifier for improving the compatibility in the regrind layer (see Patent Document 4). Even with the use of this resin composition, the problem associated with the coloration is yet to be solved.

Patent Document 1: JP-A-HEI3 (1991)-215032
Patent Document 2: JP-A-HEI3 (1991)-72542
Patent Document 3: JP-A-HEI3 (1991)-72539
Patent Document 4: JP-A-2002-234971

DISCLOSURE OF THE INVENTION

Problems to be Solved by the Invention

In view of the foregoing, it is an object of the present invention to provide a resin composition (I) which modifies a scrap laminate (a waste material such as debris and end margins of products and defective products occurring during production of the products, and a refuse of molded/formed products after use in various applications) including a polyolefin resin layer and an EVOH layer for recycling the scrap laminate to prevent coloration of a product formed from the resulting recycled material and die build-up and improve the appearance of the formed product, and to provide a forming resin composition (II) prepared by using the resin composition (I), a laminate, and a laminate producing method.

Means for Solving the Problems

According to a first inventive aspect, there is provided a resin composition (I) comprising: an ethylene-vinyl acetate copolymer (A); and a saponified ethylene-vinyl acetate copolymer (B) having an ethylene content of not less than 70 mol %; wherein the component (B) is present in a proportion of 1 to 30 parts by weight based on 100 parts by weight of the component (A).

According to a second inventive aspect, there is provided a resin composition (II) comprising: a scrap laminate including a layer of a polyolefin resin (D) and a layer of a saponified ethylene-vinyl acetate copolymer (E) having an ethylene content of 10 to 60 mol %; and the resin composition (I) described above.

According to a third inventive aspect, there is provided a laminate comprising at least one layer composed of the resin composition (II).

According to a fourth inventive aspect, there is provided a laminate producing method, which comprises the steps of: melt-kneading the resin composition (II) described above;

and forming a laminate including at least one layer composed of the resin composition (II).

The inventors of the present invention conducted intensive studies to provide a modification resin composition (I) which prevents the coloration, suppresses the die build-up and improves the appearance of a formed product. In the course of the studies, the inventors came up with an idea of using the saponified ethylene-vinyl acetate copolymer (B) having an ethylene content of not less than 70 mol % (hereinafter sometimes referred to as "higher ethylene content EVA saponification product") in combination with the EVA (A), and further conducted studies. As a result, the inventors found that the aforementioned object can be achieved by setting the proportion of the higher ethylene content EVA saponification product (B) in a specific range based on the EVA (A), and attained the present invention.

In the present invention, the layer of the polyolefin resin (polyolefin resin layer) means a layer mainly composed of the polyolefin resin, and the polyolefin resin layer may be entirely composed of the polyolefin resin. For example, the polyolefin resin layer may contain the polyolefin resin in a proportion of 70 to 100 wt %. The layer of the EVOH (EVOH layer) means a layer mainly composed of the EVOH, and the EVOH layer may be entirely composed of the EVOH. For example, the EVOH layer may contain the EVOH in a proportion of 70 to 100 wt %.

Effects of the Invention

The present invention provides the resin composition (I) comprising the EVA (A) and the higher ethylene content EVA saponification product (B), wherein the component (B) is present in a proportion of 1 to 30 parts by weight based on 100 parts by weight (hereinafter referred to simply as "parts") of the component (A). Therefore, where the resin composition (I) is used in combination with a scrap laminate including a polyolefin resin layer and an EVOH layer, the die build-up is suppressed, and a product formed from the resulting material is excellent in appearance and substantially free from the coloration.

Where the resin composition (I) further comprises at least one selected from a hydrotalcite (C1) and a higher fatty acid metal salt (C2) in a proportion of 1 to 30 parts based on 100 parts of the component (A), the die build-up is further suppressed, and the resulting formed product is more excellent in appearance and substantially free from the coloration.

The present invention further provides the resin composition (II) comprising the scrap laminate including the layer of the polyolefin resin (D) and the layer of the EVOH (E), and the resin composition (I). Therefore, a product formed from the resin composition (II) is excellent in appearance, and free from the coloration.

Where the ratio (x)/(y) of the weight (x) of the scrap laminate including the layer of the polyolefin resin (D) and the layer of the EVOH (E) to the weight (y) of the resin composition (I) containing the EVA (A) and the higher ethylene content EVA saponification product (B) is (x)/(y)= 99.5/0.5 to 60/40, the die build-up is suppressed, and the formed product is more excellent in appearance.

BRIEF DESCRIPTION OF THE DRAWING

FIG. 1 is a schematic diagram showing one exemplary preferred embodiment of the present invention.

BEST MODE FOR CARRYING OUT THE INVENTION

The present invention will hereinafter be described in detail. One exemplary embodiment (typical embodiment) of the present invention will be described below, but the present invention is not limited to the embodiment.

Resin Composition (I)

An inventive resin composition (I) comprises an ethylene-vinyl acetate copolymer (A) and an ethylene-vinyl acetate copolymer saponification product (B) having an ethylene content of not less than 70 mol % as essential components, and the component (A) and the component (B) are present in a specific ratio in the resin composition (I). The ethylene-vinyl acetate copolymer (A) according to the present invention will first be described.

Ethylene-Vinyl Acetate Copolymer (A)

The ethylene-vinyl acetate copolymer (EVA) (A) as an essential component of the resin composition (I) of the present invention is a copolymer of ethylene and vinyl acetate, which may be modified as required. Here, the essential component is antithetical to an optional component. The essential component is a component which is essentially present in the resin composition (I) without quantitative limitation.

The EVA (A) typically has a vinyl acetate content of 1 to 60 mol %, preferably 2 to 50 mol %, particularly preferably 3 to 30 mol %. If the vinyl acetate content is too low, the effects of the present invention (the suppression of the die build-up and the improvement of the appearance of the formed product) will be insufficient. On the other hand, if the vinyl acetate content is too high, the thermal stability and the extrudability of the resin composition (I) per se will be deteriorated.

The EVA (A) typically has a melt flow rate (MFR) of 0.1 to 100 g/10 minutes, preferably 0.5 to 50 g/10 minutes, particularly preferably 1 to 30 g/10 minutes (at 190° C. with a load of 2160 g). If the MFR is too low or too high, the EVA will have poorer dispersibility in other resin when being mixed with the other resin, so that the effects of the present invention cannot be sufficiently provided.

The EVA (A) may be an EVA modified with a carboxyl group in a percentage that does not impair the effects of the present invention by chemically bonding an unsaturated carboxylic acid or an unsaturated carboxylic anhydride thereto through an addition reaction or a graft reaction. More specifically, the modification percentage is preferably, for example, not greater than 10 mol %. Examples of the unsaturated carboxylic acid and the unsaturated carboxylic anhydride include ethylenically unsaturated monocarboxylic acids such as acrylic acid, methacrylic acid, ethacrylic acid and crotonic acid, and ethylenically unsaturated dicarboxylic acids, anhydrides thereof and half esters thereof such as fumaric acid, itaconic acid, citraconic acid, maleic acid, monomethyl maleate, monoethyl maleate and maleic anhydride, among which maleic anhydride is preferred.

EVAs having different ethylene contents, different molecular weights, different MFRs, different densities, different modifier groups and different modification percentages may be used either alone or in combination as the EVA (A).

Saponified Ethylene-Vinyl Acetate Copolymer (B) Having Ethylene Content of not Less than 70 mol %

The inventive resin composition (I) comprises the saponified ethylene-vinyl acetate copolymer (B) having an ethylene content of not less than 70 mol % as an essential component in addition to the component (A). This higher ethylene content EVA saponification product (B) is obtained by saponifying a vinyl acetate component of an ethylene-vinyl acetate copolymer having an ethylene content of not less than 70 mol %, and is different from the EVA (A) because of the saponification. That is, the EVA (A) is an unsaponified ethylene-vinyl acetate copolymer, while the higher ethylene content EVA saponification product (B) is a saponified ethylene-vinyl acetate copolymer.

The higher ethylene content EVA saponification product (B) may be modified as required. The ethylene-vinyl acetate copolymer is prepared by any known polymerization method such as solution polymerization, suspension polymerization or emulsion polymerization. The saponification of the ethylene-vinyl acetate copolymer may be achieved by a known method. The higher ethylene content EVA saponification product (B) is required to have an ethylene content of not less than 70 mol %, and typically has an ethylene content of not greater than 98 mol %, preferably 75 to 95 mol %, particularly preferably 80 to 95 mol %. If the ethylene content is too low, the effects of the present invention (the suppression of the die build-up and the like) will be insufficient.

The saponification degree of the higher ethylene content EVA saponification product (B) is typically not less than 20 mol %, preferably 40 to 99.5 mol %, particularly preferably 80 to 99 mol %. If the saponification degree is too low, the effects of the present invention (the suppression of the die build-up and the like) will be insufficient.

The higher ethylene content EVA saponification product (B) typically has a melt flow rate (MFR) of 0.5 to 100 g/10 minutes, preferably 1 to 50 g/10 minutes, particularly preferably 2 to 30 g/10 minutes (at 190° C. with a load of 2160 g) for excellent dispersibility and excellent effects of the present invention.

The higher ethylene content EVA saponification product (B) may be a higher ethylene content EVA saponification product modified with a carboxyl group in a percentage that does not impair the effects of the present invention by chemically bonding an unsaturated carboxylic acid or an unsaturated carboxylic anhydride thereto through an addition reaction or a graft reaction. More specifically, the modification percentage is preferably, for example, not greater than 10 mol %. Examples of the unsaturated carboxylic acid and the unsaturated carboxylic anhydride include ethylenically unsaturated monocarboxylic acids such as acrylic acid, methacrylic acid, ethacrylic acid and crotonic acid, and ethylenically unsaturated dicarboxylic acids, anhydrides thereof and half esters thereof such as fumaric acid, itaconic acid, citraconic acid, maleic acid, monomethyl maleate, monoethyl maleate and maleic anhydride, among which maleic anhydride is preferred.

Higher ethylene content EVA saponification products having different ethylene contents, different saponification degrees, different molecular weights, different MFRs, different densities, different modifier groups and different modification percentages may be used either alone or in combination as the higher ethylene content EVA saponification product (B).

In the inventive resin composition (I), the higher ethylene content EVA saponification product (B) is present in a proportion of 1 to 30 parts, preferably 1.5 to 15 parts, particularly preferably 2 to 10 parts, based on 100 parts of the EVA (A) of the present invention. If the proportion of the higher ethylene content EVA saponification product (B) is too high, the resulting formed product will be significantly colored. On the other hand, if the proportion of the higher ethylene content EVA saponification product (B) is too low, the possibility of the die build-up will be increased.

In the resin composition (I), the component (A) and the component (B) are typically present in a total proportion of 70 to 100 wt %.

The inventive resin composition (I) may further contain a thermoplastic resin such as a polyamide resin, a polyester resin or a polyolefin resin in addition to the component (A) and the component (B) in an amount that does not impair the effects of the invention (in an amount of less than 30 wt % based on the overall weight of the resin composition (I)).

For improvement of the effect of suppressing the deposition of the phase-separation product (die build-up), the inventive resin composition (I) preferably further contains at least one selected from a hydrotalcite (C1) and a higher fatty acid metal salt (C2) in addition to the component (A) and the component (B). Particularly, the hydrotalcite (C1) is preferably used because the effect of the present invention (the suppression of the coloration of the regrind layer) is superior.

Hydrotalcite (C1)

Examples of the hydrotalcite (C1) include hydrotalcite solid solutions represented by the following general formula (1):

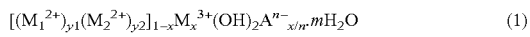

$$[(M_1^{2+})_{y1}(M_2^{2+})_{y2}]_{1-x}M_x^{3+}(OH)_2 A^{n-}_{x/n} \cdot mH_2O \quad (1)$$

wherein $M_1^{2+}$ is at least one metal selected from Mg, Ca, Sr and Ba, $M_2^{2+}$ is at least one metal selected from Zn, Cd, Pb and Sn, $M_x^{3+}$ is a trivalent metal, $A^{n-}$ is a n-valent anion, and x, y1, y2 and m are positive numbers satisfying $0<x\leq 0.5$, $0.5<y1<1$, $y1+y2=1$ and $0\leq m<2$.

In the general formula (1), $M_1^{2+}$ is preferably Mg or Ca, and $M_2^{2+}$ is preferably Zn or Cd. Further, examples of $M_x^{2+}$ include Al, Bi, In, Sb, B, Ga and Ti, which may be used either alone or in combination. Particularly, Al is preferred in practice. In the general formula (1), examples of $A^{n-}$ include $CO_3^{2-}$, $OH^-$, $HCO_3^-$, a salicylate ion, a citrate ion, a tartrate ion, $NO_3^-$, $I^-$, $(OOC-COO)^{2-}$, $ClO^{4-}$, $CH_3COO^-$, $CO_3^{2-}$, $(OOCHC=CHCOO)^{2-}$ and $[Fe(CN)_6]^{4-}$, which may be used either alone or in combination. Particularly, $CO_3^{2-}$ and $OH^-$ are useful.

Specific examples of the hydrotalcite solid solutions include $[Mg_{0.75}Zn_{0.25}]_{0.67}Al_{0.33}(OH)_2(CO_3)_{0.165} \cdot 0.45H_2O$, $[Mg_{0.79}Zn_{0.21}]_{0.7}Al_{0.3}(OH)_2(CO_3)_{0.15}$, $[Mg_{1/7}Ca_{3/7}Zn_{3/7}]_{0.7}Al_{0.3}(OH)_2(OOCHC=CHCOO)_{0.15} \cdot 0.41H_2O$, $[Mg_{6/7}Cd_{1/7}]_{0.7}Al_{0.3}(OH)_2(CH_3COO)_{0.3} \cdot 0.34H_2O$, $[Mg_{5/7}Pd_{2/7}]_{0.7}Al_{0.30}(OH)_2(CO_3)_{0.15} \cdot 0.52H_2O$, $[Mg_{0.74}Zn_{0.26}]_{0.68}Al_{0.32}(OH)_2(CO_3)_{0.16}$, $[Mg_{0.56}Zn_{0.44}]_{0.68}Al_{0.32}(OH)_2(CO_3)_{0.16} \cdot 0.2H_2O$, $[Mg_{0.81}Zn_{0.19}]_{0.74}Al_{0.26}(OH)_2(CO_3)_{0.13}$, $[Mg_{0.75}Zn_{0.25}]_{0.8}Al_{0.20}(OH)_2(CO_3)_{0.10} \cdot 0.16H_2O$, $[Mg_{0.71}Zn_{0.29}]_{0.7}Al_{0.30}(OH)_2(NO_3)_{0.30}$, $[Mg_{0.71}Zn_{0.29}]_{0.7}Al_{0.30}(OH)_2(OOCHC=CHCOO)_{0.15}$ and $[Mg_{0.14}Ca_{0.57}Zn_{0.28}]_{0.7}Al_{0.30}(OH)_{2.3} \cdot 0.25H_2O$, among which $[Mg_{0.75}Zn_{0.25}]_{0.67}Al_{0.33}(OH)_2(CO_3)_{0.165} \cdot 0.45H_2O$, $[Mg_{0.79}Zn_{0.21}]_{0.7}Al_{0.3}(OH)_2(CO_3)_{0.15}$, $[Mg_{6/7}Cd_{1/7}]_{0.7}Al_{0.3}(OH)_2(CH_3COO)_{0.3} \cdot 0.34H_2O$ and $[Mg_{5/7}Pd_{2/7}]_{0.7}Al_{0.30}(OH)_2(CO_3)_{0.15} \cdot 0.52H_2O$ are preferred.

Other examples include compounds represented by the following general formula (2):

$$M_xAl_y(OH)_{2x+3y-2z}(E)_z \cdot aH_2O \quad (2)$$

wherein M is Mg, Ca or Zn, E is $CO_3$ or $HPO_4$, x, y, z are positive numbers, a is zero or a positive number.

Specific examples of the compounds represented by the above general formula (2) include $Mg_{4.5}Al_2(OH)_{13}CO_{3.3.5}H_2O$, $Mg_5Al_2(OH)_{14}CO_3 \cdot 4H_2O$, $Mg_6Al_2(OH)_{16}CO_3 \cdot 4H_2O$, $Mg_8Al_2(OH)_{20}CO_3 \cdot 5H_2O$, $Mg_{10}Al_2(OH)_{22}(CO_3)_2 \cdot 4H_2O$, $Mg_6Al_2(OH)_{16}HPO_4 \cdot 4H_2O$, $Ca_6Al_2(OH)_{16}CO_3 \cdot 4H_2O$ and $Zn_6Al_6(OH)_{16}CO_3 \cdot 4H_2O$. The aforementioned being no limitation, e.g. compounds inexpressible by a definite chemical formula such as obtained by partly substituting the OH groups in $Mg_2Al(OH)_9 \cdot 3H_2O$ for $CO_3$ or $HPO_4$, and compounds having no crystal water (a=0) are expected to provide equivalent effects. Preferred among the above are compounds in which M is Mg and E is $CO_3$ due to their being particularly effective for forming stability and the suppression of the deposition of the phase-separation product (die build-up) occurring due to phase separation.

The hydrotalcite (C1) typically has an average particle diameter of, for example, not greater than 10 μm, preferably not greater than 5 μm, and particularly preferably not greater than 1 μm. If the average particle diameter is too great, the effects of the present invention will not be provided. The average particle diameter is herein determined by a LUZEX method.

Among the hydrotalcites described above, any of the hydrotalcite solid solutions represented by the general formula (1) is preferably used because they are highly effective for the forming stability and for the suppression of the deposition of the phase-separation product (die build-up) and the coloration.

Higher Fatty Acid Metal Salt (C2)

Examples of the higher fatty acid metal salt (C2) include alkali metal salts (e.g., lithium salts, sodium salts and potassium salts), alkali earth metal salts (e.g., magnesium salts, calcium salts and barium salts) and transition metal salts (e.g., zinc salts, copper salts, cobalt salts, iron salts and manganese salts) of organic acids having not less than 8 carbon atoms (more preferably 12 to 30 carbon atoms, particularly preferably 12 to 20 carbon atoms), among which alkali earth metal salts and transition metal salts having 12 to 20 carbon atoms are preferred, and magnesium salts, calcium salts and zinc salts of stearic acid, hydroxystearic acid, oleic acid and lauric acid are particularly preferred for the forming stability and for the suppression of the deposition of the phase-separation product (die build-up) occurring due to the phase separation.

In the inventive resin composition (I), the hydrotalcite (C1) and/or the higher fatty acid metal salt (C2) are typically present, for example, in a proportion of 1 to 30 parts, preferably 2 to 25 parts, particularly preferably 5 to 20 parts, based on 100 parts of the EVA (A). If the proportion of the component (C1) and/or the component (C2) is too low, the effects of the present invention (the suppression of the die build-up and the like) will not be sufficiently provided. On the other hand, if the proportion of the component (C1) and/or the component (C2) is too high, the resulting formed product will have poorer appearance and poorer mechanical properties, and the coloration preventing effect will be impaired.

The hydrotalcites and the higher fatty acid metal salts may be used either alone or in combination as the hydrotalcite (C1) and the higher fatty acid metal salt (C2). Where these compounds are used in combination, the total proportion is preferably within the aforementioned range.

In addition to the hydrotalcite (C1) and the higher fatty acid metal salt (C2), additives such as a lubricant, a plasticizer, a heat stabilizer, a light stabilizer, a UV absorber, an antioxidant, a crystal nucleus agent, a colorant, an antistatic agent, a surfactant, an antibacterial agent, a desiccant, an oxygen scavenger and an anti-blocking agent may be blended in the inventive resin composition (I) in an amount that does not impair the effects of the present invention (e.g., less than 30 wt % based on the overall weight of the resin composition (I)).

For suppression of the thermal degradation of the inventive resin composition (I), an antioxidant is preferably employed in combination with the components (A) and (B).

Examples of the antioxidant include: hindered phenol compounds such as dibutylhydroxytoluene, 2,5-di-t-butyl-hydroquinone, 2,6-di-t-butyl-p-cresol, 4,4'-thiobis-(6-t-butylphenol), 2,2'-methylene-bis(4-methyl-6-t-butylphenol), tetrakis[methylene-3-(3',5'-di-t-butyl-4'-hydroxyphenyl)propionate]methane, N,N'-hexamethylene-bis(3,5-di-t-butyl-4'-hydroxyhydrocinnamide), 1,3,5-trimethyl-2,4,6-tris (3,5-di-t-butyl-4-hydroxybenzyl)benzene, pentaerythritol-tetrakis[3-(3,5-di-t-butyl-4-hydroxyphenyl)propionate], triethylene glycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, 2,2-thiodiethylene-bis[3-(3,5-di-t-butyl-4-hydroxyphenyl) propionate], octadecyl-3-(3,5-di-t-butyl-4-hydroxyphenyl) propionate, 3,5-di-t-butyl-4-hydroxybenzylphosphonate diethyl ester, bis(ethyl 3,5-di-t-butyl-4-hydroxybenzylphosphonate) calcium, tris(3,5-di-t-butyl-4-hydroxybenzyl)isocyanurate, 2,4-bis[(octylthio)methyl]-o-cresol, isooctyl-3-(3,5-di-t-butyl-4-hydroxyphenyl)propionate, n-octadecyl-3-(3,5-di-t-butyl-4-hydroxyphenyl)propionate, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 4,4'-butylidene-bis(3-methyl-6-t-butylphenol), 4,4'-thiobis(3-methyl-6-t-butylphenol), and 3,9-bis{2-[3-(3-t-butyl-4-hydroxy-5-methylphenyl)-propionyloxy]-1,1-dimethylethyl}-2,4,8,10-tetraoxaspiro(5.5)undecane; phosphite compounds including triarylphosphites such as triphenylphosphite, tris(p-nonylphenyl)phosphite and tris(2,4-di-t-butylphenyl)phosphite, monoalkyldiphenylphosphites such as diphenylisooctylphosphite and diphenylisodecylphosphite, dialkylmonophenylphosphites such as phenyldiisooctylphosphite and phenyldiisodecylphosphite, and other alkylarylphosphites, trialkylphosphites such as triisooctylphosphite and tristearylphosphite, and bis(2,4-di-t-butylphenyl)pentaerythritol-diphosphite; thioether compounds such as pentaerythritol-tetrakis(β-laurylthiopropionate), tetrakis[methylene-3-(dodecylthio)propionate] methane, bis[2-methyl-4-{3-n-alkylthiopropionyloxy}-5-t-butyl-phenyl]sulfides, dilauryl-3,3'-thiodipropionate, dimyristyl-3,3'-thiodipropionate, distearyl-3,3'-thiodipropionate, pentaerythril-tetrakis(3-laurylthiopropionate), ditridecyl-3,3'-thiodipropionate, 2-mercaptobenzimidazol; hindered amine compounds such as condensation polymers of dimethyl succinate and 1-(2-hydroxyethyl)-4-hydroxy-2,2,6,6-tetramethylpiperidine, poly{[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]}, condensation polymers of N,N'-bis(3-aminopropyl)ethylenediamine and 2,4-bis[N-butyl-N-(1,2,2,6,6-pentamethyl-4-piperidyl)amino]-6-chloro-1,3,5-triazine, bis(2,2,6,6-tetramethyl-4-piperidyl)sebacate, bis(1,2,2,6,6-pentamethyl-4-piperidinyl)sebacate and bis(1,2,2,6,6-pentamethyl-4-piperidyl)-2-(3,5-di-t-butyl-4-hydroxybenzyl)-2-n-butylmalonate; benzotriazole compounds such as 2-(5-methyl-2-hydroxyphenyl)benzotriazole, 2-[2-hydroxy-3,5-bis(α,α-dimethylbenzyl)phenyl]-2H-benzotriazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl) benzotriazole, 2-(2'-hydroxy-5'-t-octylphenyl)benzotriazole, condensates of methyl-3-[3-t-butyl-5-(2H-benzotriazole-2-yl)-4-hydroxyphenyl]propionate and polyethylene glycol, hydroxyphenylbenzotriazole derivatives and 2-[2-hydroxy-3-(3,4,5,6-tetrahydrophthalimide-methyl)-5-methylphenyl] benzotriazole; and benzophenone compounds such as 2-hydroxy-4-methoxybenzophenone, 2-hydroxy-4-octyloxybenzophenone and 2,2',4,4'-tetrahydroxybenzophenone, at least one of which is selected as the antioxidant. The antioxidant may be used in any form, e.g., a powdery form, a granular form, a liquid form, a paste form or an emulsion form.

Among the aforementioned antioxidants, the hindered phenol antioxidants are preferred, and pentaerythritol-tetrakis[3-(3,5-di-t-butyl-4-hydroxyphenyl)propionate] and octadecyl-3-(3,5-di-t-butyl-4-hydroxyphenyl)propionate are particularly preferred because they are highly effective for suppressing the thermal degradation of the inventive resin composition (I) and do not impair the effects of the present invention (the suppression of the coloration of the regrind layer).

The proportion of the antioxidant is typically 0.001 to 10 parts, preferably 0.01 to 5 parts, particularly preferably 0.05 to 1 part, for example, based on 100 parts of the EVA (A). If the proportion of the antioxidant is too low, it will be impossible to sufficiently suppress the thermal degradation of the inventive resin composition (I). On the other hand, if the proportion of the antioxidant is too high, the resulting formed product will have poorer appearance and poorer mechanical properties, and the coloration preventing effect will be impaired.

As described above, the inventive resin composition (I) contains the EVA (A) and the higher ethylene content EVA saponification product (B) and, optionally, at least one selected from the hydrotalcite (C1) and the higher fatty acid metal salt (C2), and other components. The inventive resin composition (I) is preferably used as a modifier for a scrap laminate and other recycled products including a polyolefin resin layer and an EVOH layer.

The inventive resin composition (I) is typically blended with the scrap laminate for use. Exemplary methods include: [I] a method such that a mixture of the aforementioned components is blended with the scrap laminate; and [II] a method such that the aforementioned components are separately blended with the scrap laminate. Typically, the method [I] is advantageously employed. Exemplary methods of preliminarily mixing the components to provide the mixture in the method [I] include: [i] a method such that the components are melt-kneaded to be mixed together; and [ii] a method such that the components are homogeneously dissolved in a solvent to be mixed together, and then the solvent is removed. The mixture may be provided in any form, but is preferably provided in a pellet form for easy handling.

Of the aforementioned methods, the mixing method [i] is industrially preferred. This method will be described in detail by way of example, but not by way of limitation.

Exemplary methods of feeding the components (A) and (B) to a melt-kneading apparatus such as an extruder for the melt-kneading in the method [i] include: a method such that the components (A) and (B) are dry-blended and fed together into the extruder; and a method such that one of the components is first fed into the extruder and melted and then the other component is fed into the extruder (side feed method).

A known melt-kneading apparatus may be used as melt-kneading means in the method [i], and examples thereof include a kneader/loader, an extruder, a mixing roll, a Banbury mixer and a plasto mill. The melt-kneading temperature is typically 100° C. to 300° C., preferably 150° C. to 250° C., and the melt-kneading period is preferably 1 to 20 minutes. Of the aforementioned melt-kneading apparatuses, an extruder of a single screw type or a twin screw type is industrially advantageous for easy preparation of pellets of the resin composition (I). The melt-kneading apparatus is preferably provided with a vent suction device, a gear pump device and a screen device as required. It is particularly preferred that the extruder has one or more vent holes for suction at a reduced pressure in order to remove moisture, volatile components and side products (lower molecular weight substances resulting from thermal decomposition). It is also preferred to continuously supply an inert gas such as nitrogen into a hopper for prevention of intrusion of oxygen in the extruder. This alleviates thermal coloration and thermal degradation of the resin composition (I).

One feature of the present invention is that the resin composition (I) is used as the modifier which, when the scrap laminate including the polyolefin resin layer and the EVOH layer is recycled to form at least one layer of a new laminate, is blended with the scrap laminate. The scrap laminate including the polyolefin resin layer and the EVOH layer to be recycled will hereinafter be described in detail.

Scrap Laminate

In the present invention, the scrap to be recycled and blended with the resin composition (I) is a laminate including a polyolefin resin layer and an EVOH layer. The layered structure of the laminate, the number of layers of the laminate, the types and the proportions of a polyolefin resin and an EVOH, and the type of the adhesive resin layer may be selected from various examples.

The polyolefin resin layer and the EVOH layer of the laminate will be described in this order.

Polyolefin Resin Layer

The following polyolefin resins are typical examples of the polyolefin resin (D) to be used for the polyolefin resin layer.

Examples of the polyolefin resins according to the present invention include homopolymers and copolymers of olefins including polyethylenes such as linear low density polyethylenes (LLDPE), low density polyethylenes (LDPE), very low density polyethylenes (VLDPE), medium density polyethylenes (MDPE) and high density polyethylenes (HDPE), polypropylenes (PP), ethylene-vinyl acetate copolymers (EVA), ionomers, ethylene-propylene (block or random) copolymers, ethylene-acrylic acid copolymers, ethylene-acrylate copolymers, ethylene-methacrylic acid copolymers, ethylene-methacrylate copolymers, propylene-α-olefin (an α-olefin having 4 to 20 carbon atoms) copolymers, ethylene-α-olefin (an α-olefin having 4 to 20 carbon atoms) copolymers, polybutenes, polypentenes and polymethylpentenes, and blends of any of these homopolymers and copolymers. These may be used either alone or in combination. Particularly, the polyethylenes, the ethylene-vinyl acetate copolymers (EVA), the ethylene-propylene (block or random) copolymers, the polypropylenes (PP) and blends of any of these polymers are preferred in terms of economy and mechanical properties. Further, the polyethylenes, the polypropylenes (PP) and the ethylene-propylene (block or random) copolymers are particularly advantageous in that the coloration of the regrind layer is further prevented and the effects of the present invention are particularly excellent.

The polyolefin resin (D) typically has a melt flow rate (MFR) of 0.1 to 50 g/10 minutes, preferably about 0.5 to about 30 g/10 minutes (at 230° C. with a load of 2160 g).

Known additives such as a plasticizer, a lubricant, a heat stabilizer, a light stabilizer, a UV absorber, an antioxidant, a crystal nucleus agent, a colorant, an antistatic agent, a surfactant, an antibacterial agent, a desiccant, an oxygen scavenger and an antiblocking agent may be added to the polyolefin resin layer in an amount that does not impair the effects of the present invention (e.g., less than 30 wt %). Further, other polyolefin resin may be blended.

EVOH Layer

Next, an EVOH (E) to be used for the EVOH layer is typically a saponified ethylene-vinyl acetate copolymer having an ethylene content of 10 to 60 mol %. If the ethylene content is too low, the gas barrier property under high humidity conditions and the melt-formability will be impaired. On the other hand, if the ethylene content is too high, it will be impossible to provide a sufficient gas barrier property. In the present invention, the EVOH means a saponified ethylene-vinyl acetate copolymer having an excellent gas barrier property and, therefore, is different from the aforementioned higher ethylene content ethylene-vinyl acetate copolymer (EVA) saponification product, which has a higher ethylene content and different properties.

The EVOH (E) is preferably a saponified ethylene-vinyl acetate having an ethylene content of 15 to 60 mol %, more preferably 20 to 50 mol %.

The saponification degree of a vinyl acetate component of the EVOH(E) is typically not less than 90 mol %, preferably not less than 95 mol %, particularly preferably not less than 99 mol %. If the saponification degree is too low, the gas barrier property, the thermal stability and the moisture resistance will be impaired.

The EVOH (E) typically has a melt flow rate (MFR) of 0.5 to 50 g/10 minutes, preferably 1 to 35 g/10 minutes (at 210° C. with a load of 2160 g). If the MFR is too low, the melt extrusion will be difficult because of a higher viscosity. On the other hand, if the MFR is too high, instability in film formation will result.

The EVOH (E) is prepared by saponifying an ethylene-vinyl acetate copolymer having a specific ethylene content. That is, the ethylene-vinyl acetate copolymer is prepared by any known polymerization method such as solution polymerization, suspension polymerization or emulsion polymerization. The saponification of the ethylene-vinyl acetate copolymer is achieved by a known method.

In the present invention, the EVOH (E) may be copolymerized with an ethylenically unsaturated monomer copolymerizable in an amount that does not impair the effects of the invention (e.g., not greater than 10 mol %), or may be subjected to post-modification.

Examples of the copolymerizable monomer include: olefins such as propylene, 1-butene and isobutene; hydroxyl-containing α-olefins such as 3-buten-1-ol, 4-penten-1-ol, 5-hexene-1,2-diol, allyl alcohol and dimethylallyl alcohol, and derivatives such as esterification products and acylation products thereof; unsaturated acids such as acrylic acid, methacrylic acid, crotonic acid, (anhydrous) phthalic acid, (anhydrous) maleic acid and (anhydrous) itaconic acid, and salts thereof and monoalkyl or dialkyl esters thereof having 1 to 18 carbon atoms; acrylamides such as acrylamide, N—$C_{1-18}$-alkylacrylamides, N,N-dimethylacrylamide, 2-acrylamidepropanesulfonic acid and salts thereof, and acrylamidepropyldimethylamine, acid salts thereof and quaternary salts thereof; methacrylamides such as methacrylamide, N—$C_{1-18}$-alkylmethacrylamide, N,N-dimethylmethacrylamide, 2-methacrylamidepropanesulfonic acid and salts thereof, and methacrylamidepropyldimethylamine, acid salts thereof and quaternary salts thereof; N-vinylamides such as N-vinylpyrrolidone, N-vinylformamide and N-vinylacetamide; vinyl cyanates such as acrylonitrile and methacrylonitrile; vinyl ethers such as $C_{1-18}$-alkyl vinyl ethers, hydroxyalkyl vinyl ethers and alkoxyalkyl vinyl ethers; halogenated vinyls such as vinyl chloride, vinylidene chloride, vinyl fluoride, vinylidene fluoride and vinyl bromide; vinylsilanes such as trimethoxyvinylsilane; and allyl acetate, allyl chloride, trimethyl-(3-acrylamide-3-dimethylpropyl)ammonium chloride and acrylamide-2-methylpropanesulfonic acid.

Examples of the post modification include hydroxyethoxylation with a glycidyl compound, urethanation, acetalation and cyanoethylation.

Particularly, EVOHs obtained by copolymerization with any of the hydroxyl-containing α-olefins are preferred, because they impart the laminate with a gas barrier property and improve heat formability (higher-speed drawability, and secondary formability for vacuum/pressure forming and deep drawing), film forming stability, EVOH dispersibility in the regrind layer, and shock resistance of the recycled layer. Particularly, an EVOH having a 1,2-diol at its side chain is preferred.

More specifically, the 1,2-diol is a monomer having the following structural unit (3):

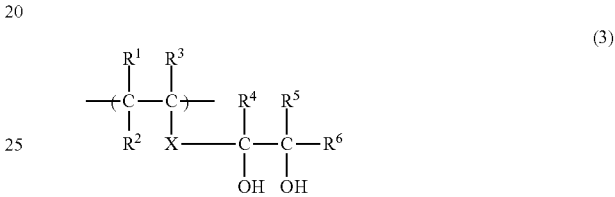

wherein $R^1$, $R^2$ and $R^3$ are independently a hydrogen atom or an organic group, X is a single bond or a bonding chain, $R^4$, $R^5$ and $R^6$ are independently a hydrogen atom or an organic group.

Particularly, where the 1,2-diol contains the 1,2-diol structural unit represented by the above general formula (3), the proportion of the 1,2-diol structural unit is typically 0.1 to 20 mol %, preferably 0.1 to 15 mol %, particularly preferably 0.1 to 10 mol %.

Examples of the organic group in the general formula (3) include halogen atoms, a hydroxyl group, ester groups, carboxyl groups, a sulfonic group, alkyl groups such as a methyl group, an ethyl group, a n-propyl group, an isopropyl group, a n-butyl group, an isobutyl group and a tert-butyl group, and aromatic groups such as a phenyl group and benzyl group. These groups may be substituted with a halogen atom, a hydroxyl group, an acyloxy group, an alkoxycarbonyl group, a carboxyl group or a sulfonic group.

In the general formula (3), $R^1$ to $R^3$ are each typically a $C_{1-30}$ alkyl group, preferably a $C_{1-15}$ alkyl group, particularly preferably a $C_{1-4}$ alkyl group, or a hydrogen atom. $R^4$ to $R^5$ are each typically a $C_{1-30}$ alkyl group, preferably a $C_{1-15}$ alkyl group, particularly preferably a $C_{1-4}$ alkyl group, or a hydrogen atom, and particularly preferably a hydrogen atom.

In the structural unit represented by the general formula (3), X is typically a single bond, but may be a bonding chain as long as the effects of the present invention are not impaired. Examples of the bonding chain include: hydrocarbons such as alkylene, alkenylene, alkynylene, phenylene and naphthylene (which may be substituted with a halogen such as fluorine, chlorine or bromine); ester bonding structures such as —O—, —$(CH_2O)_m$—, —$(OCH_2)_m$— and —$(CH_2O)_mCH_2$—; carbonyl-containing structures such as —CO—, —COCO—, —$CO(CH_2)_mCO$— and $CO(C_6H_4)$CO—; hetero atom-containing structures including sulfur atom-containing structures such as —S—, —CS—, —SO— and —$SO_2$—, nitrogen atom-containing structures such as —NR—, —CONR—, —NRCO—, —CSNR—, —NRCS— and —NRNR—, and phosphorus atom-containing structures such as —HPO$_4$—; metal atom-containing structures including silicon atom-containing structures such as —Si(OR)$_2$—, —OSi(OR)$_2$— and —OSi(OR)$_2$O—, titanium atom-containing structures such as —Ti(OR)$_2$—, —OTi(OR)$_2$— and —OTi(OR)$_2$O—, and aluminum atom-containing structures such as —Al(OR)—, —OAl(OR)— and —OAl(OR)O—, wherein Rs are independently a given substituent, particularly a hydrogen atom or an alkyl group, and m is typically a natural number of 1 to 30, preferably 1 to 15, particularly preferably 1 to 10. Among these structures, the bonding chain structure is preferably —CH$_2$OCH$_2$— or a C$_{1-10}$ alkyl chain, more preferably a C$_{1-6}$ alkyl chain, particularly preferably methylene having one carbon atom.

It is particularly preferred that R$^1$ to R$^6$ are all hydrogen atoms and X is a single bond. That is, a structural unit represented by the following formula (3a) is most preferred.

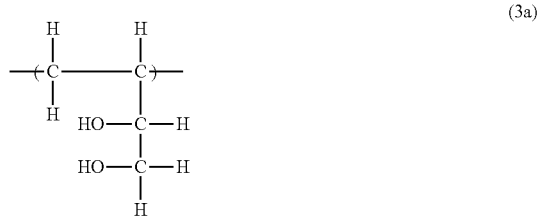

(3a)

Such a copolymer is known, and is prepared by a method, for example, disclosed in JP-A-2004-359965.

The EVOH (E) to be used in the present invention may have the following structural unit (4). The EVOH (E) having this structural unit imparts the laminate with the gas barrier property, and improves the flexibility and the flexural fatigue resistance of the laminate.

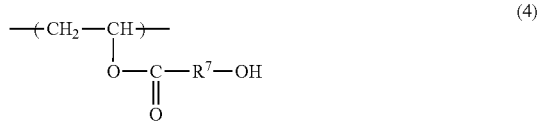

(4)

wherein R$^7$ is a substituted or unsubstituted C$_{1-30}$ alkyl chain.

In the EVOH (E), the structural unit represented by the general formula (4) is typically contained in a proportion of 0.1 to 50 mol %.

In the general formula (4), R$^7$ is typically a substituted or unsubstituted C$_{1-30}$ alkyl chain, preferably a substituted or unsubstituted C$_{2-15}$ alkyl chain, particularly preferably a substituted or unsubstituted C$_{3-10}$ alkyl chain. Examples of the alkyl chain include methylene and ethylene, which may be each substituted with a halogen atom, a hydroxyl group, an alkoxycarbonyl group, an acyloxy group, a carboxyl group or a sulfonic group.

Such a copolymer is known, and is prepared by a method disclosed, for example, in Japanese Patent Application No. 2006-109435 (JP-A-2007-277780).

In the present invention, the EVOH layer may contain at least one compound (X) selected from known boron compounds, phosphoric acid and phosphates, and lower fatty acid salts.

Examples of the boron compounds include boric acids, and metal borates. Examples of the metal borates include: alkali metal salts including lithium salts such as lithium metaborate, lithium tetraborate and lithium pentaborate, sodium salts such as sodium metaborate, sodium diborate, sodium tetraborate, sodium pentaborate, sodium hexaborate and sodium octaborate, and potassium salts such as potassium metaborate, potassium tetraborate, potassium pentaborate, potassium hexaborate and potassium octaborate; alkali earth metal salts including calcium salts such as calcium borate, magnesium salts such as magnesium orthoborate, magnesium diborate, magnesium metaborate, trimagnesium tetraborate and pentamagnesium tetraborate, and barium salts such as barium orthoborate, barium metaborate, barium diborate and barium tetraborate; cobalt salts such as cobalt borate, manganese salts such as manganese borate, manganese metaborate and manganese tetraborate, nickel salts such as nickel orthoborate, nickel diborate, nickel tetraborate and nickel octaborate, copper salts such as cupric borate, copper metaborate and copper tetraborate, silver borates such as silver metaborate and silver tetraborate, zinc salts such as zinc tetraborate and zinc metaborate, cadmium salts such as cadmium orthoborate and cadmium tetraborate, lead salts such as lead metaborate and lead hexaborate, bismuth salts such as bismuth borates, and hetero salts such as aluminum potassium borate; ammonium salts such as ammonium metaborate, ammonium tetraborate, ammonium pentaborate and ammonium octaborate; and borate minerals such as borax, kernite, inyoite, kotoite and suanite, szaibelyite. Among these, borax, boric acid and alkali metal borates are preferred, and borax, boric acid and sodium borates (sodium metaborate, sodium diborate, sodium tetraborate, sodium pentaborate, sodium hexaborate, sodium octaborate and the like) are particularly preferred.

Examples of phosphoric acid and phosphates include: phosphoric acid; alkali metal salts including sodium salts such as sodium dihydrogen phosphate and disodium hydrogen phosphate, and potassium salts such as potassium dihydrogen phosphate, dipotassium hydrogen phosphate and tripotassium phosphate; alkali earth metal salts including calcium salts such as calcium monohydrogen phosphate, calcium dihydrogen phosphate and tricalcium phosphate, magnesium salts such as magnesium phosphate, magnesium hydrogen phosphate and magnesium dihydrogen phosphate, and barium salts such as barium phosphate and barium hydrogen phosphate; and zinc hydrogen phosphate and manganese hydrogen phosphate. Phosphoric acid, and the alkali metal salts and the alkali earth metal salts thereof are preferred, and phosphoric acid, sodium dihydrogen phosphate, potassium dihydrogen phosphate, calcium dihydrogen phosphate and magnesium dihydrogen phosphate are particularly preferred.

Examples of the lower fatty acid salts include alkali metal salts (sodium salts and potassium salts), alkali earth metal salts (magnesium salts, calcium salts and barium salts), zinc salts, and manganese salts of lower fatty acids, such as acetic acid, propionic acid and butyric acid, having not more than 5 carbon atoms. Among these, the alkali metal salts and the alkali earth metal salts of the lower fatty acids having not more than 5 carbon atoms, such as sodium acetate, potassium acetate, calcium acetate and magnesium acetate, are preferred.

Where the compound (X) is a boron compound, for example, the EVOH layer typically contains the compound (X) in a proportion of 0.001 to 1 wt %, preferably 0.002 to 0.5 wt %, particularly preferably 0.002 to 0.1 wt %, based on a boron basis. Where the compound (X) is phosphoric acid or a phosphoric compound, the EVOH layer typically contains the compound (X) in a proportion of 0.0005 to 0.1 wt %, preferably 0.001 to 0.05 wt %, particularly preferably 0.002 to 0.03 wt % on a phosphate moiety basis. Where the component (X) is a lower fatty acid salt, the EVOH layer typically contains the compound (X) in a proportion of 0.001 to 0.05 wt %, preferably 0.0015 to 0.04 wt %, particularly preferably 0.002 to 0.03 wt %, on a metal basis. If the proportion of the compound (X) is too low, the forming stability, and interlayer separation resistance will be insufficient. On the other hand, if the proportion of the compound (X) is too high, the resulting formed product will have a poorer appearance.

Where two or more of the boron compounds, phosphoric acid and the phosphoric compounds, and the lower fatty acid salts are used in combination as the component (X), the proportion of each of the compounds preferably satisfies the aforementioned conditions.

Exemplary methods for forming the EVOH layer containing the compound (X) include: (I) a method such that porous precipitates of the EVOH having a water content of 20 to 80 wt % are brought into contact with an aqueous solution of the aforementioned components so as to contain the compound (X), and then dried; (II) a method such that a homogeneous solution (water/alcohol solution etc.) of the EVOH containing the aforementioned compound (X) is prepared and then extruded into strands in a solidifying liquid, and the strands are cut into pellets which are in turn dried; and (III) a method such that the EVOH and the aforementioned components are mixed together and then melt-kneaded in an extruder; (IV) a method such that an alkali component (sodium hydroxide, potassium hydroxide or the like) used in the saponification step is neutralized with an acid such as acetic acid, and the amount of the remaining acid (acetic acid) and the amounts of by-produced alkali metal salts such as sodium acetate and potassium acetate are controlled through a water washing treatment in the EVOH preparation process. For a remarkable effect, the methods (I), (II) and (IV) are preferred, which ensure superior dispersibility of the acid and the metal salts.

Different EVOHs may be used either alone or in combination as the EVOH (E). Where two or more of the EVOHs are employed for preparation of an EVOH blend, the EVOHs preferably satisfy at least one of the conditions: [I] the ethylene contents thereof differ from each other by 5 mol % or more; [II] the saponification degrees thereof differ from each other by 1 mol % or more; and [III] the ratio of the MFRs thereof is 2 or more, because the EVOH blend imparts the laminate with the gas barrier property and the flexural fatigue resistance, and improves the flexibility and the heat formability (the higher-speed drawability, and the secondary formability for vacuum/pressure forming and deep drawing) and the forming stability.

Exemplary methods of preparing the EVOH blend containing two or more of the different EVOHs include: a method such that two or more types of unsaponified EVA pastes are mixed together, and then saponified; a method such that two or more types of EVOHs are mixed with at least one solvent selected from an alcohol and water, and then the resulting mixture is pelletized; and a method such that pellets of two or more types of EVOHs are mixed together and then melt-kneaded.

Known additives such as a plasticizer, a lubricant, a heat stabilizer, a light stabilizer, a UV absorber, an antioxidant, a crystal nucleus agent, a colorant, an antistatic agent, a surfactant, an antibacterial agent, a desiccant, an oxygen scavenger and an antiblocking agent may be blended in the EVOH layer in an amount that does not impair the effects of the present invention (e.g., less than 30 wt %). Further, other polyolefin resin may be blended.

Adhesive Resin Layer

The laminate includes at least the polyolefin resin layer and the EVOH layer. The laminate may optionally include a layer of an adhesive resin.

The adhesive resin for the adhesive resin layer may be selected from various types of adhesive resins. The adhesive resin is determined depending upon the type of the polyolefin resin to be used for the laminate. Examples of the adhesive resin include olefin polymers modified with a carboxyl group by chemically bonding an unsaturated carboxylic acid or an anhydride thereof to an olefin polymer (the aforementioned polyolefin resin) through an addition reaction or a graft reaction. Specific examples of the adhesive resin include polyethylenes graft-modified with maleic anhydride, polypropylenes graft-modified with maleic anhydride, ethylene-propylene (block or random) copolymers graft-modified with maleic anhydride, ethylene-ethylacrylate copolymers graft-modified with maleic anhydride, and ethylene-vinyl acetate copolymers graft-modified with maleic anhydride, which may be used either alone or in combination.

The proportion of the unsaturated carboxylic acid or the anhydride thereof in the olefin polymer is not particularly limited, but is typically 0.001 to 3 wt %, preferably 0.01 to 1 wt %, particularly preferably 0.03 to 0.5 wt %, based on the weight of the polymer. If the modification percentage is too low, interlayer adhesion will be insufficient. On the other hand, if the modification percentage is too high, the adhesive resin will undergo a crosslinking reaction, thereby having unsatisfactory formability.

The adhesive resin layer may further contain a rubber-elastomer component such as a polyisobutylene, an ethylene-propylene rubber (EPR) or a styrene-hydrogenated butadiene block copolymer (SEBS). Where the matrix resin of the adhesive resin is the polyolefin resin, blending of a second polyolefin resin different from this polyolefin resin advantageously improves the adhesiveness.

The inventive laminate including the polyolefin resin layer and the EVOH layer may include a layer formed of a mixture of the inventive resin composition (I) and the scrap laminate including the polyolefin resin layer and the EVOH layer (i.e., a layer (regrind layer) formed of a forming resin composition (II) to be described later).

The thicknesses of the respective layers of the laminate are determined depending upon the layered structure, the type of the polyolefin resin, the use purpose, the shape of a container to be formed, and required physical properties. The polyolefin resin layer typically has a thickness of 5 to 5000 μm, preferably 30 to 1000 μm. The EVOH layer typically has a thickness of 5 to 500 μm, preferably 10 to 200 μm. Where the laminate has the adhesive resin layer, the adhesive resin layer typically has a thickness of 5 to 400 μm, preferably 10 to 150 μm. Where the laminate has the regrind layer, the regrind layer typically has a thickness of 5 to 5000 μm, preferably 30 to 1000 μm.

The thickness ratio of the polyolefin resin layer to the EVOH layer is typically 1/1 to 100/1, preferably 5/1 to 20/1. Further, the thickness ratio of the resin composition (II) layer to the EVOH layer is typically 1/1 to 100/1, preferably 5/1 to 20/1. If the thickness ratio of the EVOH layer is too small, the laminate will have an unsatisfactory gas barrier property.

Recycling of Scrap Laminate

A scrap laminate (a waste material such as debris and end margins of products and defective products and a refuse of molded/formed products) including the polyolefin resin layer and the EVOH layer occurs during production thereof or after use in various applications. When the scrap laminate is to be recycled (as a so-called scrap return or regrind material), the inventive modification resin composition (I) described above is used.

The scrap laminate to be recycled typically includes a single type of formed products, but may include two or more types of formed products.

When the laminate described above is produced by any of the following production methods, a great amount of scrap laminate occurs. With an increasing demand for the recycling of the scrap laminate, it is preferred to use the inventive modification resin composition (I) for the recycling of the scrap laminate. Exemplary production methods include direct blowing methods (of a continuous type and an accumulator type) and multilayer sheet secondary forming methods (a vacuum forming method, a pressure forming method, a vacuum/pressure forming method and the like). More specifically, a parison formed by co-extrusion of a polyolefin resin layer and an EVOH layer is held in a mold to be blown by feeding air for production of a bottle or a tube, or a multilayer sheet prepared by a given method as including a polyolefin layer and an EVOH layer is vacuum-drawn or pressure-drawn into a cup, a tray or the like.

For use, the inventive resin composition (I) is mixed with the scrap, and the resulting mixture is melt-formed to provide a formed product. A method for melt-forming the mixture prepared by mixing the inventive resin composition (I) with the scrap will hereinafter be described.

The scrap laminate is preferably pulverized for the melt-forming by means of an extruder or the like.

For the pulverization of the scrap, a known pulverizer may be used. The shape and the particle size of the pulverized scrap are such that the apparent density is typically 0.25 to 0.85 g/ml, preferably 0.3 to 0.7 g/ml, particularly preferably 0.35 to 0.6 g/ml as measured in conformity with a test method "5.3 Apparent Density" specified in JIS-K6891. If the apparent density is too small, the dispersion of the EVOH in the regrind layer will be insufficient, so that the melt-formability and the mechanical properties of a regrind layer of a formed product will be impaired. If the apparent density is too great, the melt-formability of the regrind layer of the formed product will be impaired due to improper feeding to the extruder.

The apparent density can be controlled by properly controlling the shape of a pulverization blade of the pulverizer, the rotation speed of the pulverization blade, the rate of the pulverization, a mesh size and the like.

In the scrap, the EVOH is typically present in a proportion of 0.1 to 30 wt % based on the overall weight of the scrap, and preferably 0.3 to 25 wt %, particularly preferably 0.5 to 20 wt %, to properly provide the effects of the present invention. The present invention has the effect of improving a scrap containing the EVOH in any proportion, particularly, a scrap containing the EVOH in a proportion in the range described above.

The proportion of the EVOH in the scrap depends upon the thickness ratio of the EVOH layer in the laminate. If the proportion of the EVOH is too low, a proper amount of the same or different type of a virgin EVOH may be mixed as required to control the proportion of the EVOH. On the other hand, if the proportion of the EVOH is too high, it is practically preferred to mix a proper amount of the same or different type of a virgin polyolefin resin to control the proportion of the EVOH.

Then, the inventive modification resin composition (I) is blended with the scrap described above. For the blending of the resin composition (I), a known mixer such as a rocking mixer, a ribbon blender, a super mixer, a line mixer or the like may be used.

The amount of the inventive resin composition (I) to be added to the scrap depends upon the layered structure of the scrap, the type of the polyolefin resin, the proportion of the EVOH, the shape of the container, the use purpose of the product and the required properties, but the ratio (x)/(y) of the weight (x) of the scrap to the weight (y) of the inventive resin composition (I) is typically (x)/(y)=99.5/0.5 to 60/40, preferably 99/1 to 70/30, particularly preferably 98/2 to 90/10. If the amount of the resin composition (I) is too small, it will be difficult to provide the effects of the invention. On the other hand, if the amount of the resin composition (I) is too great, the resulting formed product will have a poorer appearance and poorer mechanical properties, and the forming process suffers from significant odor.

The inventive modification resin composition (I) is blended with the scrap to provide a mixture (resin composition (II)) of the scrap and the resin composition (I). The resin composition (II) will hereinafter be described.

Forming Resin Composition (II)

The resin composition (II) thus prepared may be fed into the extruder as it is for forming a product. Alternatively, the resin composition (II) may be preliminarily pelletized with the use of a melt-kneading machine such as a single screw extruder or a twin screw extruder by a known method, and the resulting pellets may be fed into the extruder for forming a product. The melt-forming temperature for the melt extrusion is typically selected from the range of 150° C. to 300° C.

Although it is possible to mix a proper amount of the same type or different type of a virgin polyolefin resin with the resin composition (II) and feed the resulting mixture into the extruder, it is preferred in terms of productivity and economy to feed the resin composition (II) as it is into the extruder for forming a product.

In the resin composition (II), the higher ethylene content EVA saponification product (B) is typically present in a proportion of less than 0.3 parts based on a total of 100 parts of the polyolefin resin (D) and the EVOH (E). The upper limit is preferably 0.28 parts, particularly preferably 0.25 parts. A lower limit is not particularly limited, but typically 0.001 part, preferably 0.01 part, particularly preferably 0.05 parts. If the proportion of the higher ethylene content EVA saponification product (B) is too low, the effect of suppressing the deposition of the phase-separation product (die build-up) will be marred. On the other hand, if the proportion of the higher ethylene content EVA saponification product (B) is too high, the effect of suppressing the coloration of the regrind layer will be marred.

Where any of the resins in the pulverized scrap contains the higher ethylene content EVA saponification product (B), the amount of the higher ethylene content EVA saponification product (B) in the pulverized scrap is added to the total amount of the higher ethylene content EVA saponification product (B) in the inventive modification resin composition (I).

The forming resin composition (II) is formed into any products. Examples of the products include films, sheets, tapes, cups, trays, tubes, bottles, pipes, filaments, profile extrusion products and indefinite formed products.

In the forming process, the resulting product is often subjected to a thermal stretching process to improve the properties of the formed product and to impart the product with an intended container shape. The thermal stretching process herein means a process for homogeneously forming an evenly thermally heated film, sheet or parison into a cup, a tray, a tube, a bottle or a film by means of a chuck, a plug, a vacuum, a pressure or blowing. Exemplary stretching methods include a roll stretching method, a tenter stretching method, a tubular stretching method, a stretch blowing method, a vacuum forming method, a pressure forming method and a vacuum/pressure forming method. The thermal stretching process may be based on either uniaxial stretching or biaxial stretching. The biaxial stretching may be achieved by a simultaneous biaxial stretching method or a sequential biaxial stretching method. The stretching temperature is typically 60° C. to 170° C., preferably 80° C. to 160° C.

The resin composition (II) is typically used not only for production of the aforementioned exemplary formed products but also for formation of at least one layer (regrind layer) of the laminate. A laminate including the regrind layer will hereinafter be descried in detail.

Laminate Including Regrind Layer

The laminate including the regrind layer is merely required to include at least one layer composed of the aforementioned resin composition (II), and preferably includes a polyolefin resin layer and an EVOH layer in addition to the regrind layer and, as required, an adhesive resin layer.

Specific examples of the layered structure of the laminate having the regrind layer include a polyolefin resin layer/regrind layer/adhesive resin layer/EVOH layer structure, a polyolefin resin layer/regrind layer/adhesive resin layer/EVOH layer/adhesive resin layer/polyolefin resin layer structure, a polyolefin resin layer/regrind layer/adhesive resin layer/EVOH layer/adhesive resin layer/regrind layer/polyolefin resin layer structure, a regrind layer/EVOH layer structure, a regrind layer/adhesive resin layer/EVOH layer structure, a regrind layer/adhesive resin layer/EVOH layer/adhesive resin layer/EVOH layer structure, a regrind layer/adhesive resin layer/EVOH layer/adhesive resin layer/polyolefin resin layer structure, a regrind layer/adhesive resin layer/EVOH layer/adhesive resin layer/regrind layer/polyolefin resin layer structure and a polyolefin resin layer/adhesive resin layer/EVOH layer/regrind layer/EVOH layer/adhesive resin layer/polyolefin resin layer structure.

The thicknesses of the respective layers of the laminate including the regrind layer are determined depending upon the layered structure, the type of the polyolefin resin, the use purpose, the shape of the container and the required properties. The regrind layer typically has a thickness of 5 to 5000 μm, preferably 30 to 1000 μm. The EVOH layer typically has a thickness of 5 to 500 μm, preferably 10 to 200 μm. The polyolefin resin layer typically has a thickness of 5 to 5000 μm, preferably 30 to 1000 μm. Where the laminate includes the adhesive resin layer, the adhesive resin layer typically has a thickness of 5 to 400 μm, preferably 10 to 150 μm.

The thickness ratio between the regrind layer and the polyolefin resin layer is typically 1/5 to 10/1, preferably 1/2 to 5/1. The thickness ratio between the regrind layer/the EVOH layer is typically 1/1 to 100/1, preferably 5/1 to 20/1.

Production Method for Laminate Including Regrind Layer

For production of the laminate including the regrind layer, the same types of resins as those employed for the formation of the scrap laminate may be used as ingredients, and the same method may be employed. More specifically, the laminate including the regrind layer is produced by using the same types of a polyolefin resin, an EVOH and an adhesive resin as respectively employed for the polyolefin resin layer, the EVOH layer and the adhesive resin layer of the scrap laminate, and using any of the following exemplary laminating methods.

The exemplary laminating methods for the production of the laminate include: a method such that the resin composition (II) is melt-extruded on an EVOH film or sheet for lamination; a method such that the resin composition (II) is melt-extruded on a polyolefin base layer for lamination; a method such that the EVOH or the polyolefin resin are co-extruded with the resin composition (II); and a method such that a film or sheet of the EVOH or the polyolefin resin and a film or sheet of the resin composition (II) are dry-laminated with the use of an adhesive such as of an organic titanium compound, an isocyanate compound, a polyester compound or a polyurethane compound. The melt-forming temperature for the melt extrusion is typically in the range of 150° C. to 300° C.

The preparation of the forming resin composition (II) by blending the modification resin composition (I) with the scrap for the recycling of the scrap and the production of the laminate according to a preferred embodiment of the present invention are shown in FIG. 1.

The laminate including the regrind layer is used as it is for production of products having various shapes. The laminate is preferably subjected to a thermal stretching process for improvement of the properties thereof and for production of a container having an intended shape.

The thermal stretching process herein means a process for homogeneously forming an evenly thermally heated film, sheet or parison into a cup, a tray, a tube, a bottle or a film by means of a chuck, a plug, a vacuum, a pressure or blowing.

Exemplary stretching methods for the thermal stretching process include a roll stretching method, a tenter stretching method, a tubular stretching method, a stretch blowing method, a vacuum forming method, a pressure forming method and a vacuum/pressure forming method. For biaxial stretching, either a simultaneous biaxial stretching method or a sequential biaxial stretching method may be used. The stretching temperature is typically 60° C. to 170° C., preferably about 80° C. to about 160° C. The thermal stretching process may be based on either uniaxial stretching or biaxial stretching. The thermal stretching process is preferably performed with a higher draw ratio so as to provide a stretched formed product which is free from pin holes, cracks, uneven stretching, uneven wall thickness, delamination during the stretching, and is excellent in gas barrier property and other physical properties.

As described above, the scrap to be used for the regrind layer may also include a regrind layer. A laminate including at least one regrind layer containing such scrap can be formed by the same method by employing the same types of resins as contained in the scrap as ingredients. That is, the laminate including at least one regrind layer (recycled product) may be produced by using the resin composition (II) prepared from the scrap, and a scrap of the recycled product is recycled again to form a regrind layer of a laminate (re-recycled product).

The recycling method is not limited to the aforementioned methods, but the recycling may be achieved by: [1] using a scrap laminate including different types of polyolefin resin layers and different types of EVOH layers and/or different types of scrap laminates for the same type of the regrind layer; or [2] using the scrap for formation of a regrind layer of a laminate containing a polyolefin resin and an EVOH which are different from the polyolefin resin and the EVOH contained in the scrap.

Examples of a polyolefin resin, an EVOH and an adhesive resin to be respectively used for the polyolefin resin layer, the EVOH layer and the adhesive resin layer of the laminate including at least one regrind layer and recycled more than twice by the laminate production method using the inventive resin composition (II) are those employed for the laminate described above.

An antioxidant, a heat stabilizer, a light stabilizer, a lubricant, an antistatic agent, a crystal nucleus agent, a plasticizer, a colorant, a UV absorber, a surfactant, an antibacterial agent, a desiccant, an oxygen scavenger, an antiblocking agent, a slipping agent, an inorganic or organic filler and the like may be added to the layers of the inventive laminate in an amount that does not impair the effects of the present invention.

The laminate described above can be formed not only into a sheet or a film but also into a pipe, a tube, or a container such as a tank or a bottle in the same manner as the aforementioned laminate by the same forming method as described above. Further, the laminate may be re-heated typically up to about 60° C. to about 170° C. and stretched to be formed into a container such as a bottle, a tube, a cup or a tray by the aforementioned method, i.e., by a blow stretching method or a drawing method (vacuum forming, pressure forming, vacuum/pressure forming).

The resulting laminate may be subjected to a heat treatment, a cooling treatment, a rolling process, a printing process, a dry laminate process, a solution/melt coating process, a bag forming process, a deep drawing process, a box forming process, a tube forming process or a sprit processing process as required.

The laminate thus prepared, whether it is a recycled product or a re-recycled product, is useful for formation of various containers for general foods, seasonings such as mayonnaise and dressing, fermented foods such as fermented soybean paste, oil and fat foods such as salad oil, soup, beverages, cosmetics, pharmaceutical products, detergents, perfumes, industrial reagents, agrochemicals, fuels and the like. Particularly, the laminate is useful for containers for semisolid foods and seasonings such as mayonnaise, ketchup, sauce, fermented soybean paste, Japanese wasabi, mustard, and dip for grilled beef, bottles and tubular containers for liquid beverages and seasonings such as salad oil, Japanese cooking sake, Japanese refined sake, beer, wine, juice, black tea, sports drinks, mineral water and milk, cup-like containers for semisolid foods and seasonings such as fruit, jelly, pudding, yogurt, mayonnaise, fermented soybean paste, processed rice, processed foods and soup, and tray-like containers for raw meat, processed meat foods (ham, bacon, sausage and the like), cooked rice and pet foods.

EXAMPLES

The present invention will hereinafter be described by way of specific examples. It should be understood that the invention be not limited to the examples within the scope of the invention.

Prior to the description of inventive examples and comparative examples, ingredients will be described below.
1. Ingredients for Resin Composition (I)
EVA (A)
An ethylene-vinyl acetate copolymer (ULTRATHENE 3B53A available from Tosoh Corporation, and having a vinyl acetate content of 28 wt %, an MFR of 5.7 g/10 minutes (at 190° C. with a load of 2160 g))

Resin Comparative to EVA (A)
A low density polyethylene (NOVATEC LD LF320H available from Japan Polyethylene Inc., and having a density of 0.924 g/cm$^3$, an MFR of 1.1 g/10 minutes (at 190° C. with a load of 2160 g))
Higher Ethylene Content EVA Saponification Product (B)
A saponified ethylene-vinyl acetate copolymer (MELTHENE H0051K available from Tosoh Corporation, and having an ethylene content of 89 mol %, a saponification degree of 99 mol %, and an MFR of 6.5 g/10 minutes (at 190° C. with a load of 2160 g))
Hydrotalcite (C1)
A hydrotalcite solid solution (ZHT-4A available from Kyowa Chemical Industry Co., Ltd.)
Higher Fatty Acid Metal Salt (C2)
Calcium stearate (NISSAN CALCIUM STEARATE S available from NOF Corporation)
Antioxidant
Pentaerythritol-tetrakis[3-(3,5-di-t-butyl-4-hydroxyphenyl)propionate (IRGANOX 1010 available from Ciba Specialty Chemicals Inc.)
2. Ingredients for Scrap Laminates
Polyolefin Resin (D)
A polypropylene (NOVATEC PP EA9 available from Japan Polypropylene Corporation, and having a density of 0.90 g/cm$^3$, an MFR of 0.5 g/10 minutes (at 230° C. with a load of 2160 g))
EVOH (E)
A saponified ethylene-vinyl acetate copolymer (a melt blend prepared by mixing a saponified ethylene-vinyl acetate copolymer having an ethylene content of 32 mol %, a saponification degree of 99.6 mol % and an MFR of 3.5 g/10 minutes (at 210° C. with a load of 2160 g) and containing boric acid in a proportion of 0.015% on a boron basis, sodium acetate in a proportion of 0.015% on a sodium basis and calcium dihydrogen phosphate in a proportion of 0.005% on a phosphate moiety basis, and a saponified ethylene-vinyl acetate copolymer having an ethylene content of 44 mol %, a saponification degree of 97.0 mol % and an MFR of 3.5 g/10 minutes (at 210° C. with a load of 2160 g) and containing boric acid in a proportion of 0.01% on a boron basis and sodium acetate in a proportion of 0.01% on a sodium basis in a weight ratio of 75/25 by means of a twin screw extruder)
Adhesive Resin
An ethylene-propylene random copolymer graft-modified with maleic anhydride (MODIC AP P604V available from Mitsubishi Chemical Corporation, and having a density of 0.90 g/cm$^3$ and an MFR of 3.2 g/10 minutes (at 230° C. with a load of 2160 g))

Resin compositions (I) and scrap laminates were prepared by using the aforementioned ingredients.
1. Preparation of Resin Compositions (I) (Examples 1 to 5 and Comparative Examples 1 and 2)
Pellets of resin compositions (I) according to Examples and Comparative Examples were each prepared by mixing the ingredients in proportions shown in Table 1 and melt-kneading the resulting mixture by a co-rotating twin screw extruder. Melt-kneading conditions were as follows:
Melt-Kneading Conditions
    Melt-kneading apparatus: A co-rotating twin screw extruder having a diameter of 30 mm and an L/D ratio of 42
    Conditions: A temperature of 210° C., a screw rotation speed of 160 rpm, an extrusion rate of 10 kg/hr, an average resin kneading period of 2 minutes

TABLE 1

|  | Example | | | | | Comparative Example (parts by weight) | |
| --- | --- | --- | --- | --- | --- | --- | --- |
| Resin Composition (I) | 1 | 2 | 3 | 4 | 5 | 1 | 2 |
| EVA (A) | 85 | 95 | 90 | 70 | 88 | — | 40 |
| Polyethylene | — | — | — | — | — | 85 | — |
| Higher ethylene content EVA saponification product (B) | 5 | 5 | 5 | 20 | 2 | 5 | 50 |
| Hydrotalcite solid solution | 5 | — | 5 | 5 | 5 | 5 | 5 |
| Calcium stearate | 5 | — | — | 5 | 5 | 5 | 5 |
| Antioxidant | 0.5 | 0.5 | 0.5 | 0.5 | 0.2 | 0.5 | 0.5 |
| Proportion of (B) based on 100 parts of (A) | 5.9 | 5.3 | 5.6 | 28.6 | 2.3 | — | 125 |

4. Preparation of Scrap Laminates

Model compositions, which were regarded as being equivalent to scrap laminates each serving as materials for resin compositions (II), were each prepared by dry-blending 89 parts of polypropylene pellets, 5 parts of EVOH pellets and 2 parts of adhesive resin pellets (in Example 9 and Comparative Example 4, 92 parts of polypropylene pellets, 3 parts of EVOH pellets and 4 parts of adhesive resin pellets). Even if the model compositions each prepared by blending the ingredients in the weight ratio calculated from the thickness ratio of the respective layers of the laminate are regarded as being equivalent to the scrap laminates, the same effects are provided without any problem.

5. Preparation of Resin Compositions (II) (Examples 6 to 10 and Comparative Examples 3 to 5)

Intended resin compositions (II) were each prepared by dry-blending 96 parts of pellets of the resulting scrap laminate (model composition) and 4 parts of pellets of the resulting resin composition (I) (in Example 9 and Comparative Example 4, 99 parts of pellets of the scrap and 1 part of pellets of the resulting composition (I)). The proportions of the ingredients for each of the compositions are shown in Table 2. The proportion of the higher ethylene content EVA saponification product based on a total of 100 parts of the polyolefin and the EVOH is also shown in Table 2.

6. Formed Products

Single-layer films were formed by means of a single screw extruder by using the resin compositions (II) of Examples 5 to 8 and Comparative Examples 3 to 5 thus prepared. Conditions for the single layer film formation are as follows.

Film Formation Conditions

Extruder: Having a diameter of 40 mm and an L/D ratio of 28
Screw: A full flight type having a CR of 3.5
Screen pack (for removal of foreign matter): Including three screens of 90/120/90 meshes (stacked one on another)
Die: A coat hanger type having a width of 450 mm
Temperatures: 180° C., 200° C., 220° C., 230° C., 230° C. and 230° C. at C1, C2, C3, C4, A and D (C1 to C4, A and D indicate heating portions of the extruder. More specifically, C1 to C4 are barrel portions of the extruder arranged in this order from a hopper side. C4 is a screw distal end, A is an adaptor portion, and D is a die portion.)
Screw rotation speed: 40 rpm
Drawing speed: 2 m/minute
Roll temperature: 80° C.
Film thickness: 100 μm

TABLE 2

|  | Example | | | | | Comparative Example (parts by weight) | | |
| --- | --- | --- | --- | --- | --- | --- | --- | --- |
| Resin composition (II) | 6 | 7 | 8 | 9 | 10 | 3 | 4 | 5 |
| Resin composition | | | | | | | | |
| Resin composition used (Examples 1 to 5 and Comparative Examples 1, 2) | Example 1 | Example 2 | Example 3 | Example 4 | Example 5 | Comparative Example 1 | Comparative Example 2 | — |
| EVA (A) | 3.38 | 3.76 | 3.56 | 0.7 | 3.52 | — | 0.4 | — |
| Polyethylene | — | — | — | — | — | 3.38 | — | — |
| Higher ethylene content EVA saponification product (B) | 0.2 | 0.2 | 0.2 | 0.2 | 0.08 | 0.2 | 0.5 | — |
| Hydrotalcite solid solution | 0.2 | — | 0.21 | 0.05 | 0.2 | 0.2 | 0.05 | — |
| Calcium stearate | 0.2 | — | — | 0.05 | 0.2 | 0.2 | 0.05 | — |
| Antioxidant | 0.02 | 0.02 | 0.02 | 0.005 | 0.008 | 0.02 | 0.005 | — |
| Scrap | | | | | | | | |
| Polypropylene (D) | 89 | 89 | 89 | 92 | 89 | 89 | 92 | 89 |
| EVOH (E) | 5 | 5 | 5 | 3 | 5 | 5 | 3 | 5 |
| Adhesive resin | 2 | 2 | 2 | 4 | 2 | 2 | 4 | 2 |
| Proportion of higher ethylene content EVA saponification product (B) based on total of 100 parts of (D) + (E) | 0.21 | 0.21 | 0.21 | 0.2 | 0.09 | 0.21 | 0.51 | — |

The resulting films were evaluated for appearance (holes, surface smoothness and coloration) through visual inspection according to the following test methods. The results of the evaluation are shown in Table 3.

Holes

The number of holes per 1000-$cm^2$ area of each of the films was measured, and the films were each evaluated based on the following criteria:
○ Less than 2 holes
Δ 2 to 4 holes
X 5 holes or more Surface Smoothness The films were each visually inspected and evaluated based on the following criteria:
◎ Neither line/wave patterns nor surface roughness were observed.
○ Line/wave patterns and surface roughness were hardly observed.
Δ Line/wave patterns and surface roughness were slightly observed.
X Line/wave patterns and surface roughness were remarkably observed.

Coloration

The films were each visually inspected, and evaluated for coloration (pinking) based on the following criteria:
○ No coloration (neither yellowing nor reddening) was observed.
Δ Coloration (yellowing or reddening) was slightly observed.
X Coloration (yellowing or reddening) was apparently observed.

TABLE 3

|  | Example | | | | | Comparative Example | | |
|---|---|---|---|---|---|---|---|---|
|  | 6 | 7 | 8 | 9 | 10 | 3 | 4 | 5 |
| Holes | ○ | ○ | ○ | ○ | ○ | ○ | ○ | X |
| Surface smoothness | ◎ | ○ | ◎ | ◎ | ◎ | X | ◎ | X |
| Coloration (pinking) | ○ | ○ | ○ | ○ | ○ | ○ | X | ○ |

On the other hand, a process in which the resin compositions (II) of Examples 6 to 10 and Comparative Examples 3 to 5 thus prepared were each melt-extruded (melt-pelletized) by means of a single screw extruder was repeated five times, and the resin compositions (II) were evaluated for the phase-separation product (die build-up). The results of the evaluation are shown in Table 4. The melt extrusion conditions are as follows.

Extruder: Having a diameter of 40 mm and an L/D ratio of 28
Screw: A full flight type having a CR of 3.5
Screen pack: 90/120/90 meshes
Die: A strand die having three holes each having a diameter of 3.5 mm
Temperatures: 180° C., 200° C., 220° C., 230° C., 230° C. and 230° C. at C1, C2, C3, C4, A and D (C1 to C4, A and D indicate heating portions of the extruder. More specifically, C1 to C4 are barrel portions of the extruder arranged in this order from a hopper side. C4 is a screw distal end, A is an adaptor portion, and D is a die portion.)
Screw rotation speed: 40 rpm Phase-Separation Product Deposited on Die Lip A phase-separation product deposited on a die lip during the melt-extrusion process repeated five times was collected, and the resin compositions (II) were each evaluated based on the following criteria related to the total weight of the deposited phase-separation product.
◎ The total weight of the deposited phase-separation product was less than 0.05 g
○ The total weight of the deposited phase-separation product was not less than 0.05 g and less than 0.1 g
Δ The total weight of the deposited phase-separation product was not less than 0.1 g and less than 0.2 g
X The total weight of the deposited phase-separation product was not less than 0.2 g Phase-Separation Product Deposited on Screw Surface After the melt-extrusion process repeated five times, the screw was taken out and visually checked for the deposition of the phase-separation product on a screw surface. Further, the phase-separation product deposited on the screw surface was collected, and the total weight of the deposited phase-separation product was measured. The resin compositions (II) were each evaluated based on the following criteria.
◎ Virtually no phase-separation product was observed (less than 0.1 g)
○ The deposited phase-separation product was hardly observed (not less than 0.1 g and less than 0.2 g)
Δ The deposited phase-separation product was slightly observed (not less than 0.2 g and less than 0.3 g)
X The deposited phase-separation product was remarkably observed (not less than 0.3 g)

TABLE 4

|  | Example | | | | | Comparative Example | | |
|---|---|---|---|---|---|---|---|---|
|  | 6 | 7 | 8 | 9 | 10 | 3 | 4 | 5 |
| Phase-separation product deposited on die lip | | | | | | | | |
| Measured value (g) | 0.049 | 0.071 | 0.059 | 0.085 | 0.0044 | 0.229 | 0.070 | 0.363 |
| Evaluation | ◎ | ○ | ○ | ○ | ◎ | X | ○ | X |
| Phase-separation product deposited on screw surface | | | | | | | | |
|  | ◎ | ○ | ◎ | ○ | ◎ | Δ | ○ | X |

As apparent from the above results, the films formed of the resin compositions (II) of Examples 6 to (corresponding to the resin compositions (I) of Examples 1 to 5) were substantially free from holes, and excellent in surface smoothness. Further, the films were free from coloration and substantially free from occurrence and deposition of the phase-separation product during the melt-forming and, therefore, were totally excellent.

On the other hand, the film formed of the resin composition of Comparative Example 3 (corresponding to Comparative Example 1) containing no component (A) was poorer in surface smoothness, and the phase-separation product was deposited on the die lip. The film formed of the resin composition of Comparative Example 4 (corresponding to Comparative Example 2) containing the component (B) in a proportion greater than that specified by the present invention suffered from coloration (pinking), and was poorer in appearance. The film formed of the resin composition of Comparative Example 5 not containing the inventive resin composition (I) but containing the scrap alone suffered from holes, significantly poorer surface smoothness, and significant occurrence and deposition of the phase-separation product.

The resin compositions (II) of Examples 6 to 10 were more effective for preventing coloration of formed products, imparting the formed products with excellent appearance, and suppressing the occurrence and deposition of the phase-separation product than the resin compositions of Comparative Examples. Where the resin compositions (II) are each used as a material for at least one layer of a laminate, the same excellent effects as described above will be provided.

Examples 11 to 14

Example 11 was substantially the same as Example 6, except that a different adhesive resin was used for the scrap.

Example 12 was substantially the same as Example 11, except that the scrap and the resin composition (I) were blended in a different blending ratio.

Examples 13 and 14 were substantially the same as Examples 11 and 12, except that an EVOH containing 1,2-diol groups at side chains was used instead of the EVOH for the scrap.

1. Preparation of Resin Compositions (I)

A resin composition (I) prepared by employing the same ingredients and preparation conditions as in Example 1 was used.

2. Preparation of Scrap Laminates

Model compositions, which were regarded as being equivalent to scrap laminates each serving as materials for resin compositions (II), were each prepared by dry-blending 89 parts of polypropylene pellets, 5 parts of EVOH pellets and 2 parts of adhesive resin pellets (in Examples 12 and 14, 92 parts of polypropylene pellets, 3 parts of EVOH pellets and 4 parts of adhesive resin pellets). Even if the model compositions each prepared by blending the ingredients in the weight ratio calculated from the thickness ratio of the respective layers of the laminate are regarded as being equivalent to the scrap laminates, the same effects are provided without any problem.

Polyolefin Resin (D)

A polypropylene (NOVATEC PP EA9 available from Japan Polypropylene Corporation, and having a density of 0.90 g/cm$^3$ and an MFR of 0.5 g/10 minutes (at 230° C. with a load of 2160 g)) was used.

EVOH (E-1)

A saponified ethylene-vinyl acetate copolymer having an ethylene content of 32 mol %, a saponification degree of 99.6 mol % and an MFR of 3.5 g/10 minutes (at 210° C. with a load of 2160 g) was used.

EVOH (E-2)

A saponified ethylene-vinyl acetate copolymer (having a structural unit represented by the formula (3a)) having an ethylene content of 32 mol %, a saponification degree of 99.6 mol % and an MFR of 3.5 g/10 minutes (at 210° C. with a load of 2160 g) and containing 1.0 mol % of a 1,2 glycol structure was used.

Adhesive Resin

A polypropylene graft-modified with maleic anhydride (Plexar PX6002 available from EQUISTAR, and having a density of 0.892 g/cm$^3$ and an MFR of 2.3 g/10 minutes (at 230° C. with a load of 2160 g)) was used.

3. Preparation of Resin Compositions (II) (Examples 11 to 14)

Intended resin compositions (II) were each prepared by dry-blending 96 parts of pellets of the resulting scrap laminate (model composition) and 4 parts of pellets of the resulting resin composition (I) (in Examples 12 and 14, 99 parts of pellets of the scrap and 1 part of pellets of the resulting composition (I)). The proportions of the ingredients of each of the compositions are shown in Table 5. The proportion of the higher ethylene content EVA saponification product (B) based on a total of 100 parts of the polyolefin and the EVOH is also shown in Table 5.

TABLE 5

| Forming resin | Example | | | |
|---|---|---|---|---|
| composition (II) | 11 | 12 | 13 | 14 |
| Resin Composition | | | | |
| Resin composition (I) used | Example 1 | Example 1 | Example 1 | Example 1 |
| EVA (A) | 3.38 | 0.7 | 3.38 | 0.7 |
| Polyethylene | — | — | — | — |
| Higher ethylene content EVA saponification product (B) | 0.2 | 0.2 | 0.2 | 0.2 |
| Hydrotalcite solid solution | 0.2 | 0.05 | 0.2 | 0.05 |
| Calcium stearate | 0.2 | 0.05 | 0.2 | 0.05 |
| Antioxidant | 0.02 | 0.005 | 0.02 | 0.005 |
| Scrap | | | | |
| Polypropylene (D) | 89 | 92 | 89 | 92 |
| EVOH (E-1) | 5 | 3 | — | — |
| EVOH (E-2) | — | — | 5 | 3 |
| Adhesive resin | 2 | 4 | 2 | 4 |
| Proportion of higher ethylene content EVA saponification product (B) based on total of 100 parts of (D) + (E) | 0.21 | 0.2 | 0.21 | 0.2 |

4. Formed Products

Single-layer films were formed by means of a single screw extruder by using the resin compositions (II) of Examples 11 to 14 thus prepared. The same conditions as in Examples 5 to 8 were employed for the single layer film formation.

The resulting films were evaluated for appearance (holes, surface smoothness and coloration) by the same test methods as in Examples 5 to 8. Further, the films were evaluated for shock resistance (film impact) and EVOH dispersion (a dispersion state and a dispersion diameter) by the following test methods. The results of the evaluation are shown in Table 6.

Shock Resistance (Film Impact Test)

The film impact values of the films were determined under the following conditions for evaluation.

Apparatus: A YSS type film impact tester (MODEL 181 available from Yasuda Seiki Seisakusho Ltd.)
Impact ball: A plastic ball having a radius of 12.5 mm
Load: 15 kgf-cm
Film conditioning conditions: Moisture conditioning at 23° C. at 50% RH for 1 week EVOH Dispersion State The EVOH dispersion state in a center portion of the film was observed under the following conditions for evaluation.

Apparatus: A digital HD microscope (Keyence's VH-Z450)
Observation sections: A TD section and an MD section of the film
Measurement magnification: Observed at X450
Observation method: An iodine solution was applied to the film sections prior to the observation, and the film sections were observed with portions thereof colored with iodine being regarded as the EVOH resin and with uncolored portions thereof being regarded as the polypropylene or the adhesive resin.
Evaluation method: The film was evaluated for the EVOH agglomeration states in the observed film sections based on the following criteria.

◎ The EVOH was homogeneously dispersed without agglomeration
○ A minute EVOH agglomeration layer having a thickness of less than 3 μm was observed in the center portion, but the EVOH was substantially homogeneously dispersed.
Δ An EVOH agglomeration layer having a thickness of not less than 3 μm and less than 10 μm was observed in the center portion.
X An EVOH agglomeration layer having a thickness of not less than 10 μm was observed in the center portion.

EVOH Dispersion Diameter

The EVOH dispersion state in the center portion of the film was observed under the following conditions for evaluation.

Apparatus: A digital HD microscope (Keyence's VH-Z450)
Observation section: An MD section of the film
Measurement magnification: Observed at X450
Observation method: An iodine solution was applied to the film section prior to the observation, and the film section was observed with portions thereof colored with iodine being regarded as the EVOH resin and with uncolored portions thereof being regarded as the polypropylene or the adhesive resin.
Evaluation method: The average particle MD-diameter L of dispersed EVOH particles observed in an area of 50 μm×50 μm was determined from the following equation (1), and evaluated based on the following criteria.

Average particle MD diameter $L$ (μm)=(Sum of particle MD diameters of dispersed particles)/(Number of dispersed particles)  (1)

◎ EVOH particles were finely dispersed as having an average particle diameter L of less than 5 μm.
○ EVOH particles were dispersed as having an average particle diameter L of not less than 5 μm and less than 10 μm.
Δ EVOH particles were dispersed as having an average particle diameter L of not less than 10 μm and less than 15 μm.
X EVOH particles were dispersed as having an average particle diameter L of not less than 15 μm.

TABLE 6

|  | Example | | | |
| --- | --- | --- | --- | --- |
|  | 11 | 12 | 13 | 14 |
| Holes | ○ | ○ | ○ | ○ |
| Surface smoothness | ◎ | ◎ | ◎ | ◎ |
| Coloration (pinking) | ○ | ○ | ○ | ○ |
| Film impact (kgf-cm) | 4.7 | 2.5 | 5.0 | 3.4 |
| EVOH dispersion state | ○ | Δ | ◎ | ○ |
| Particle diameter of dispersed EVOH | ◎ | ○ | ◎ | ◎ |

As apparent from the above results, the resin compositions (II) of Examples 11 to 14 containing the resin composition (I) of Example 1 were effective for prevention of the holes and the coloration and for improvement of the surface smoothness of the recycle layer even with the scrap containing the adhesive resin different from that in Examples 1 to 5. The resin compositions (II) of Examples 11 to 14 containing the resin composition (I) of Example 1 were satisfactory in impact resistance. Particularly, the resin compositions (II) of Examples 13 and 14 containing the EVOH having the 1,2-glycol structural unit represented by the aforementioned formula (3a) were more excellent in impact resistance. When these forming compositions were observed by the microscope, it was found that the EVOH particles were homogeneously and finely dispersed in each of the resin compositions (II). The impact resistance was supposedly attributable to the fine dispersion of the particles of the EVOH having the 1,2-glycol structural unit represented by the aforementioned formula (3a).

1. Preparation of Resin Composition (I)

Example 15 was substantially the same as Example 1, except that a polyethylene was used as the polyolefin resin for the scrap.

Comparative Example 7 was substantially the same as Example 15, except that a resin composition (I) containing no EVA modifier (Comparative Example 6) was used.

2. Preparation of Scrap Laminates

Model compositions, which were regarded as being equivalent to scrap laminates each serving as materials for resin compositions (II), were each prepared by dry-blending 91 parts of polyethylene pellets (polyolefin resin (D-1)), 3 parts of EVOH pellets (E-3) and 2 parts of adhesive resin pellets. Even if the model compositions each prepared by blending the ingredients in the weight ratio calculated from the thickness ratio of the respective layers of the laminate are regarded as being equivalent to the scrap laminates, the same effects are provided without any problem.

Polyolefin Resin (D-1)

A high-density polyethylene (NOVATEC HD HB431 available from Japan Polyethylene Corporation, and having a density of 0.957 g/cm³, a melting point of 134° C. and an MFR of 0.35 g/10 minutes (at 190° C. with a load of 2160 g))

EVOH (E-3)

A saponified ethylene-vinyl acetate copolymer having an ethylene content of 32 mol %, a saponification degree of 99.6 mol % and an MFR of 3.5 g/10 minutes (at 210° C. with a load of 2160 g), and containing boric acid in a proportion of 0.015% on a boron basis, sodium acetate in a proportion of 0.015% on a sodium basis and calcium dihydrogen phosphate in a proportion of 0.005% on a phosphate moiety basis Adhesive Resin A high-density polyethylene graft-modified with maleic anhydride (MODIC AP H511V available from Mitsubishi Chemical Corporation, and having a density of 0.94 g/cm³, a melting point of 133° C. and an MFR of 0.3 g/10 minutes (at 190° C. with a load of 2160 g))

3. Preparation of Resin Compositions (II) (Examples 15 and Comparative Example 7)

Intended resin compositions (II) were each prepared by dry-blending 96 parts of pellets of the resulting scrap laminate (model composition) and 4 parts of pellets of the resulting resin composition (I). The proportions of the ingredients of each of the compositions are shown in Table 7. The proportion of the higher ethylene content EVA saponification product (B) based on a total of 100 parts of the polyolefin (D-1) and the EVOH (E-3) is also shown in Table 7.

TABLE 7

|  | (parts by weight) | |
| --- | --- | --- |
| Resin composition (II) | Example 15 | Comparative Example 7 |
| Resin composition (II) | | |
| Resin composition (I) used | Example 1 | Comparative Example 6 |
| EVA (A) | 3.38 | — |

TABLE 7-continued

| | (parts by weight) | |
|---|---|---|
| Resin composition (II) | Example 15 | Comparative Example 7 |
| Polyethylene | — | 2.8 |
| Higher ethylene content EVA saponification product (B) | 0.2 | 0.8 |
| Hydrotalcite solid solution | 0.2 | 0.2 |
| Calcium stearate | 0.2 | 0.2 |
| Antioxidant | 0.02 | 0.008 |
| Scrap | | |
| Polyolefin (D-1) | 91 | 91 |
| EVOH (E-3) | 3 | 3 |
| Adhesive resin | 2 | 2 |
| Proportion of higher ethylene content EVA saponification product (B) based on total of 100 parts of (D) + (E) | 0.21 | 0.85 |

4. Formed Product

Single-layer films were formed by means of a single screw extruder by using the resin compositions (II) of Example 15 and Comparative Example 7 thus prepared. The same conditions as in Examples 5 to 8 were employed for the single layer film formation.

The resulting films were evaluated for appearance (holes, surface smoothness and coloration) by the test methods employed in Examples 5 to 8. The results of the evaluation are shown in Table 8.

TABLE 8

| | Example 15 | Comparative Example 7 |
|---|---|---|
| Holes | ◯ | ◯ |
| Surface smoothness | ⊚ | Δ |
| Coloration (pinking) | ◯ | X |

On the other hand, a process in which the resin compositions (II) of Example 15 and Comparative Example 7 thus prepared were each melt-extruded (melt-pelletized) by means of a single screw extruder was repeated five times as in Examples 5 to 8, and the resin compositions (II) were evaluated by the following test method for deposition of phase-separation products (die build-up). The results of the evaluation are shown in Table 9.

TABLE 9

| | Example 15 | Comparative Example 7 |
|---|---|---|
| Phase-separation product deposited on die lip | | |
| Measured value (g) | 0.075 | 0.09 |
| Evaluation | ◯ | ◯ |
| Phase-separation product deposited on screw surface | ⊚ | ◯ |

As apparent from the above results, the film formed of the resin composition (II) of Example 15 (corresponding to the resin composition (I) of Example 1) was substantially free from holes, and superior in surface smoothness. Further, the film was free from coloration and substantially free from occurrence and deposition of the phase-separation product during the melt-forming and, therefore, totally excellent.

On the other hand, the film formed of the resin composition of Comparative Example 7 (corresponding to the resin composition (I) of Comparative Example 6) containing no EVA (component (A) was poorer in surface smoothness and appearance, and suffered from coloration (pinking).

Thus, the resin composition (II) of Example 15 was more effective for preventing coloration of a formed product, imparting the formed product with excellent appearance, and suppressing the occurrence and deposition of the phase-separation product than the resin composition of Comparative Example 7. Where the resin composition (II) is used as a material for at least one layer of a laminate, the same excellent effects as described above will be provided.

INDUSTRIAL APPLICABILITY

The inventive resin composition (I) is blended with a scrap laminate (a waste material such as debris and end margins of products and defective products occurring during production of the products, and a refuse of molded/formed products after use in various applications) including a polyolefin resin layer and an EVOH layer for recycling the scrap laminate. When the resulting resin composition (II) is melt-formed for recycling, the formed product is free from coloration and excellent in transparency. Further, the present invention prevents the aforementioned problems of the prior art, i.e., gelation occurring after the melt-forming of the resin composition (II) and the occurrence of wave patterns and holes in the formed product, and is highly effective for prevention of the occurrence of the phase-separation product (die build-up). The formed product is particularly useful as packaging materials for foods and drugs.

What is claimed is:

1. A method of producing a resin composition (II) comprising:
    blending a resin composition (I) with a scrap laminate including a layer of a polyolefin resin (D) of polyethylene or polypropylene, having a melt flow rate (MFR) of 0.5 to 30 g/10 minutes (at 230° C. with a load of 2160 g) and a layer of a saponified ethylene-vinyl acetate copolymer (E) having an ethylene content of 20 to 50 mol %, having a saponification degree of not less than 90 mol % and having a melt flow rate (MFR) of 1 to 35 g/10 minutes (at 210° C. with a load of 2160 g);
    wherein the resin composition (I) comprises an unsaponified ethylene-vinyl acetate copolymer (A) having a vinyl acetate content of 3 to 30 mol % and having a melt flow rate (MFR) of 1 to 30 g/10 minutes (at 190° C. with a load of 2160 g); and
    a saponified ethylene-vinyl acetate copolymer (B) having an ethylene content of 80 to 95 mol %, having a saponification degree of not less than 20 mol % and having a melt flow rate (MFR) of 2 to 30 g/10 minutes (at 190° C. with a load of 2160 g);
    wherein a ratio (x)/(y) of weight (x) of the scrap laminate to weight (y) of the resin composition (I) is (x)/(y)= 99.5/0.5 to 90/10;
    wherein the saponified ethylene-vinyl acetate copolymer (E) has a proportion of 0.1 to 20 wt % based on the overall weight of the scrap;
    wherein the saponified ethylene-vinyl acetate copolymer (B) in the resin composition (I) is present in a proportion of from 0.05 to a proportion of 0.25 parts by weight based on a total of 100 parts by weight of the polyolefin resin (D) and the saponified ethylene-vinyl acetate copolymer (E) in the scrap;
    wherein the component (B) is present in a proportion of 1 to 30 parts by weight based on 100 parts by weight of the component (A) in the resin composition (I).

2. The method as set forth in claim 1, further comprising blending at least one selected from a hydrotalcite (C1) and a higher fatty acid metal salt (C2) in a proportion of 1 to 30 parts by weight based on 100 parts by weight of the unsaponified ethylene-vinyl acetate copolymer (A).

\* \* \* \* \*